US006878230B2

(12) United States Patent
Abe et al.

(10) Patent No.: US 6,878,230 B2
(45) Date of Patent: Apr. 12, 2005

(54) METHOD OF MANUFACTURING GLUED LAMINATED WOOD

(75) Inventors: Yukio Abe, Aichi (JP); Makoto Isobe, Aichi (JP); Issaku Okamura, Aichi (JP); Hiroshige Oda, Aichi (JP); Akihito Hamaguchi, Aichi (JP); Noriyuki Honda, Aichi (JP)

(73) Assignee: Meinan Machinery Works, Inc., Obu (JP)

( * ) Notice: Subject to any disclaimer, the term of this patent is extended or adjusted under 35 U.S.C. 154(b) by 35 days.

(21) Appl. No.: 10/254,566

(22) Filed: Sep. 26, 2002

(65) Prior Publication Data

US 2004/0060634 A1 Apr. 1, 2004

(51) Int. Cl.[7] ................................................ B32B 31/00

(52) U.S. Cl. ...................... 156/304.5; 156/87; 156/264; 156/304.6; 156/512; 156/182; 156/517; 156/559; 156/583.1; 144/347; 144/348; 144/352; 144/354; 144/346

(58) Field of Search ................................ 156/264, 512, 156/517, 87, 182, 304.5, 304.6, 311, 321, 322, 559, 583.1; 144/347, 348, 352, 354, 346

(56) References Cited

U.S. PATENT DOCUMENTS 4,608,106 A 8/1986 Lahtinen
4,675,066 A * 6/1987 Honda ........................ 156/285

FOREIGN PATENT DOCUMENTS

JP 53-41408 9/1976
JP 53-18707 2/1978
JP 53-75313 7/1978
JP 54-11215 1/1979
JP 55-123404 9/1980

OTHER PUBLICATIONS

J. C. Bolen, *Laminated–Veneer Lumber—Development and Economics*—vol. 22, No. 1, 1972, p. 10–18.

* cited by examiner

*Primary Examiner*—Linda Gray
(74) *Attorney, Agent, or Firm*—Armstrong, Kratz, Quintos, Hanson & Brooks, LLP

(57) ABSTRACT

A method of manufacturing glued laminated wood such as laminated veneer lumber (LVL) is disclosed. The glued laminated wood is made of a number of wood sheets such as veneer sheets which are laminated together by a hot press with a thermosetting adhesive into a continuous length of multiple-layered board wherein the end joints of the wood sheets are disposed in a staggered array. There is provided an initial base material having an end which is shaped in the form of a flight of steps including a series of alternate horizontal surface having a lengthwise dimension smaller than the length of the wood sheet and a vertical surface having a height corresponding to the wood sheet thickness, and the glued laminated wood board is formed extending from the end of such initial base material. The hot press includes a pair of heat plates each having an effective pressing area capable of covering the entire surface of the wood sheet. In hot pressing a wood sheet having on one surface thereof coated with adhesive, a board of the glued laminated wood in progress is placed and maintained for a predetermined length of time at a position where the entire top surface of the wood sheet is kept to be pressed from the top by one of the plates while the entire lower surface of the wood sheet is supported from the bottom by the other plate.

20 Claims, 33 Drawing Sheets

METHOD OF MANUFACTURING GLUED LAMINATED WOOD

BACKGROUND OF THE INVENTION

1. Field of the Invention

The present invention relates to a method of manufacturing glued laminated wood which is made of wood sheets such as veneer sheets provided by rotary peeling, slicing, or other wood material as obtained by sawing or otherwise prepared. More specifically, it relates to a method of laying such wood sheets and laminating them together successively by means of thermosetting adhesive thereby to produce the glued laminated wood in the form of a multiple-layered board or a billet with a desired thickness and length.

2. Description of the Related Art

For better understanding of the underlying background of the present invention, firstly reference is made to FIG. 73 which schematically shows a prior art apparatus for making laminated veneer lumber (LVL) wherein veneer sheets are laminated together the end joints thereof disposed in a staggered array and with the wood grain of each veneer sheet running primarily along the length of the resulting product or LVL board.

The apparatus includes three sets of hot presses X, Y and Z arranged at three different stages spaced at an interval along the direction in which the LVL board is conveyed as indicated by arrow at the right-hand side on the drawing. Each of the hot presses X, Y and Z has a pair of movable upper and lower heat plates X1, Y1 and Z1 disposed one above the other, respectively. For the sake of the description of the apparatus, these three sets of hot presses X, Y and Z will be referred to as the first, second and third hot presses, respectively. Though not shown specifically in the drawing, there are provided three sets of veneer feeders associated with the respective hot presses X, Y and Z, and each set includes upper and lower movable veneer sheet feeders as indicated by arrows which depict the feeding directions. In the drawing, reference symbols A, B and C designate veneer sheets each having substantially the same length, width and thickness and disposed in the same orientation with the wood grain thereof extending substantially parallel to each other, i.e. extending along the lengthwise direction of the LVL board. It is noted that, for the sake of convenience in illustration, each veneer sheet is illustrated with a thickness which is shown exaggeratedly large relative to its length and also that a conveyer for moving a work in process is omitted from the illustration.

In manufacturing the LVL board with the apparatus of FIG. 73, firstly a pair of veneer sheets A depicted by shading is prepared with one surface of either one of such veneer sheets A coated with thermosetting adhesive. These veneer sheets A are fed by the first feeders for the first hot press X and combined in contact with each other with the adhesive-coated surface placed between the mating surfaces of the two veneer sheets A and with the ends thereof in an offset or staggered relation as shown in the drawing. These two veneer sheets A thus placed one on the other are conveyed to the first pressing station between the first heat plates X1, where the veneer sheets A are glued together under heat and pressure by the hot press X. After the first hot pressing operation is competed and the heat plates X1 are retracted, the glued laminated veneer sheets A are conveyed toward the second pressing station at the second hot press Y. On the way to the second pressing station, i.e. at an appropriate position between the first and second pressing stations, another pair of veneer sheets B, indicated by shading, each having on the inner surfaces thereof coated with adhesive is fed by the second veneer sheet feeders and laid on the opposite outer surfaces of the previously laminated veneer sheets A in a staggered relation to the veneer sheets A. The veneer sheets B thus laid onto the veneer sheets A are conveyed therewith to the second pressing station, where the veneer sheets B are pressed by the second hot press Y to be bonded to the laminated veneer sheets A.

After pressing by the second hot press Y is over, the laminated veneer sheets A and B are conveyed toward the third station at the third hot press Z. At an appropriate position between the second and third pressing stations, still another pair of veneer sheets C, indicated by shading, having on the inner surfaces thereof coated with adhesive is fed by the third veneer feeders and laid on the opposite outer surfaces of the veneer sheets B in a staggered arrangment. The veneer sheets C thus placed on the laminated veneer sheets A and B are conveyed to the third pressing station, where they are similarly pressed by the third hot press Z. Thus, an assembly of laminated veneer sheets A, B and C is formed.

Steps of operation including the above veneer sheet feeding, laying, hot pressing and conveying are performed successively at the respective positions and stations, whereby an LVL board with six plies as counted through its thickness is formed in a manner which is well known to those skilled in the art. As shown in FIG. 73, any two adjacent veneer sheets A, B or C in each layer are disposed with the ends thereof abutting closely each other to form end joints, and the veneer sheets A, B and C are laid such that the end joints are distributed in a regularly staggered arrangement in the resulting LVL board. As is apparent to those skilled in the art, if end joints in any two adjacent layers are located in alignment with each other across the thickness of the board, stress tends to be centered at such joints when the board is subjected to bending force, thereby inviting breakage of the board. Therefore, the purpose of the staggered arrangement of the end joints of the component veneer sheets is to avoid such concentration of stress at specific locations in the board.

For successful gluing of veneer sheets with the desired bonding strength, heat and pressure by hot pressing should be applied uniformly to the entire surfaces of veneer sheets with at least one of the mating surfaces thereof coated with adhesive. In hot pressing a pair of veneer sheets A, B or C in an offset or staggered arrangement as shown in FIG. 73 in the above apparatus, however, part of the paired combined veneer sheets fails to receive direct hot pressing action by the hot press. That is, upstream end portions of veneer sheets A, B and C, as viewed in the conveying direction, which are indicated by R, fail to be pressed directly by the hot press, although some heat will be conducted to such area of the veneer sheets. As a result, the upstream end portions of veneer sheets will not be bonded with the desired strength, thus affecting the quality of the resulting product.

If veneer sheets are laid in such a staggered array that the area R is narrowed with an attempt to obviate the above drawback, the end joints in any two adjacent layers in the board will be disposed closer to each other, thereby rendering the board weaker against bending.

Therefore, it is an object of the present invention to provide a method of manufacturing glued laminated wood which can solve the above-described problems. More specifically, an object of the invention is to provide a method which can hot press the entire surface of wood sheets such as veneer sheet for production of glued laminated wood with the desired strength and quality.

SUMMARY OF THE INVENTION

In order to achieve the above objects, the invention provides a method of manufacturing glued laminated wood which is made of a number of wood sheets such as veneer sheets, each having a predetermined length, width and thickness, laminated together by hot pressing with a thermosetting adhesive into a continuous length of multiple-layered board of the glued laminated wood. For manufacturing such continuous length of board of glued laminated wood, an initial base material is prepared which has an end from which the continuous length of glued laminated wood board is to be formed extending in its lengthwise direction. The end of the initial base material is shaped in the form of a flight of steps which include a series of alternate horizontal surface having a lengthwise dimension that is smaller than the length of the wood sheet and a surface formed at an angle with respect to the horizontal surface. The spaced interval between any two adjacent horizontal surfaces across the thickness of the base material is substantially the same as the thickness of the wood sheet. The wood sheets in the respective layers of the glued laminated wood board adjacent to the end of the base material are located with one ends thereof disposed in facing relation to the above respective surfaces formed at an angle with respect to the horizontal surfaces so that the wood sheets are laminated in the glued laminated wood board with the opposite ends thereof remote from the initial base material disposed in a staggered array which is similar to the above-described form of flight of steps at the end of the initial base material.

For hot pressing wood sheets for lamination to produce the continuous length board of the glued laminated wood, a hot press is used which includes a pair of plates, at least one of which is heated, each having an effective pressing area capable of covering the entire surface of the wood sheet. In hot pressing at least one wood sheet for lamination by such hot press, a board of the glued laminated wood in progress is placed and maintained for a predetermined length of time at a position where the entire top surface of the above at least one wood sheet is kept to be pressed from the top by one of the plates while the entire lower surface of the same one wood sheet is supported from the bottom thereof by the other plate with a layer of adhesive interposed between surfaces of that wood sheet and its adjacent wood sheets.

By so hot pressing the wood sheet, it is pressed in its entirety with application of uniform heat and pressure and, therefore, tight bonding of the wood sheet for successful lamination can be achieve.

According to the invention, the above angle with respect to the horizontal surface at the end of the initial base material should preferably a right angle so that the end of the initial base material is shaped in the form of a flight of steps including a series of alternate a horizontal surface and a vertical surface having a height which is substantially the same as the thickness of the wood sheet, and each wood sheet has its opposite ends cut at a right angle through the thickness thereof, accordingly.

When using such initial base material and wood sheets, each wood sheets in each layer should be disposed in the glued laminated wood board preferably with the ends thereof in abutment with the ends of the adjacent wood sheets in the same layer.

Instead forming end joints by abutment of the adjacent ends, wood sheets in each layer may disposed with a space formed between any two facing end faces of any two adjacent wood sheets in the same layer.

Alternatively, each wood sheet may have its opposite ends scarf-cut or beveled at a predetermined angle in the same direction with respect to the opposite surfaces of the wood sheet and the wood sheets may be laminated together with the beveled ends thereof in overlapping relation to their adjacent similarly beveled ends of adjacent wood sheets in the same layer, whereby lap end joints are formed in the resulting glued laminated wood board.

In a preferred embodiment of the invention, the initial base material is made of a plurality of wood sheets which are assembled one on another and laminated together into the form of an assembly having one end thereof formed in the above-described flight of steps which includes a series of alternate a horizontal surface and a vertical end face of such woos sheets.

According to a preferred embodiment of the present invention, the component wood sheets to be glued together into the multiple-layered board of the glued laminated wood include veneer sheets which are laminated together with the wood grain thereof running primarily along the length of the glued laminated wood board.

It is to be noted that substituting at least one component wood sheet of the glued laminated wood board with at least two wood sheets glued together or otherwise fixed, whose total thickness substantially corresponds to the thickness of the component wood sheet, is considered to fall within the scope of the invention.

For practicing the method of the invention, the method includes a step of moving a board of the glued laminated wood in progress to the above position where the entire top surface of at least one wood sheet is kept to be pressed from the top by one of the plates of the hot press while the entire lower surface of the same wood sheet is supported from the bottom thereof by the other plate.

Features and advantages of the present invention will become more apparent to those skilled in the art from the following description of various preferred embodiments according to the invention, which description is made with reference to the accompanying drawings, wherein:

DESCRIPTION OF THE EMBODIMENTS

Figure 73:
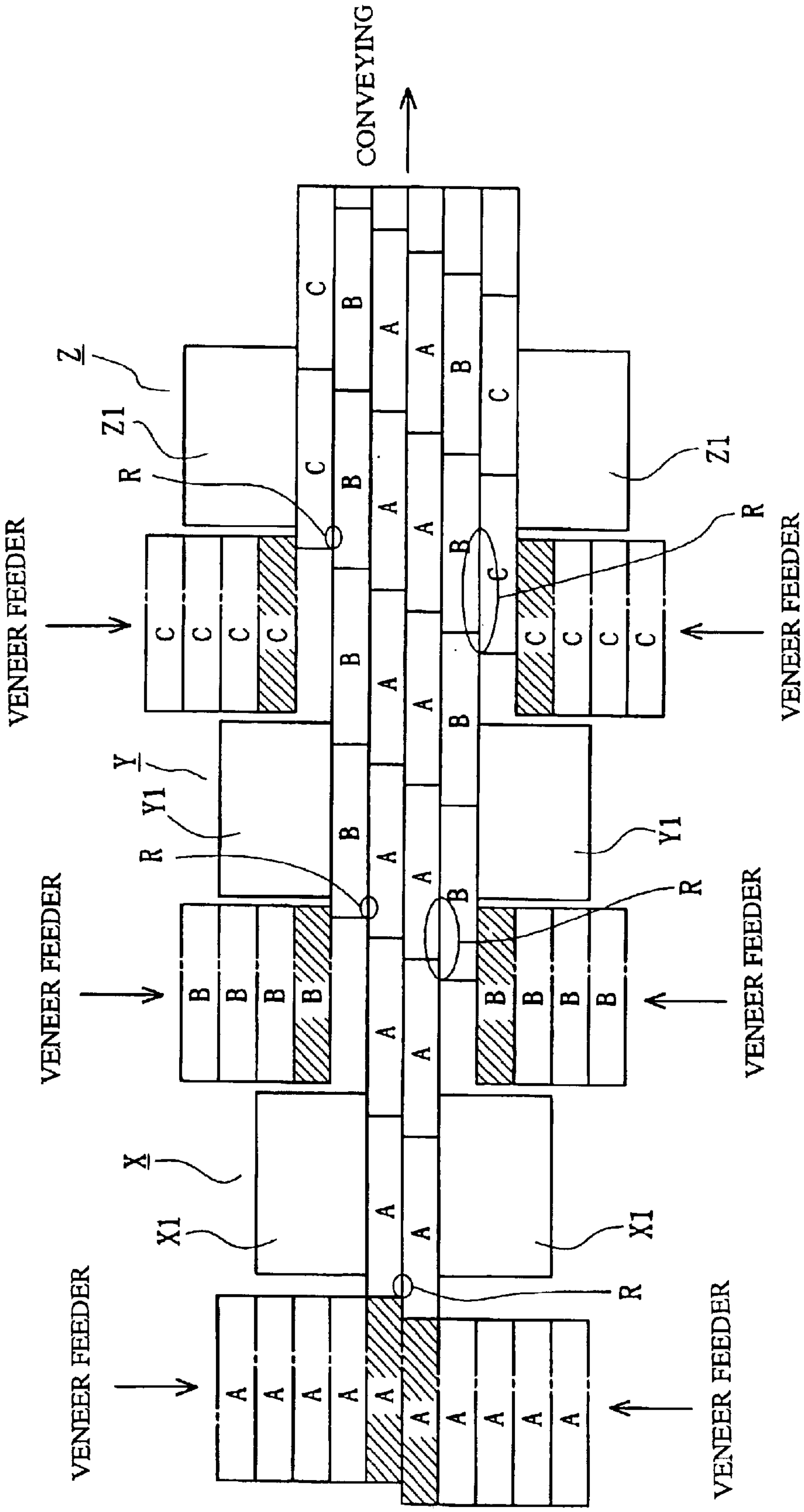
FIG. 73 PRIOR ART
FIG. 73 is schematic illustrative view showing a prior art apparatus for manufacturing LVL as an example of glued laminated wood.

The following will describe embodiments of the method of manufacturing glued laminated wood according to the present invention. The following description about the embodiments will deal with manufacturing of LVL as the glued laminated wood. All veneer sheets for use in the embodiments have been dried and have substantially the same dimensions, e.g. a thickness of about 4 mm, a length of about 1,000 mm as measured along the wood grain orientation thereof extending laterally as viewed in the plane of the drawings, and a width of about 600 mm, unless otherwise specified. The above dimensions of veneer sheets are used only for explanatory purpose and, therefore, veneer sheets with any desired dimensions are usable. All veneer sheets will be laid and glued together with the wood grain thereof aligned primarily along the length of the resulting LVL board. It is noted that for the sake of illustration each veneer sheet is shown to have a thickness which is exaggeratedly large relative to its length as in the case of FIG. 73.

Referring firstly to FIGS. 1A through 1C, 2A through 2C, 3A through 3C and 4A and 4B, the first preferred embodiment will be described. In the drawings, reference numerals 3 and 5 designate lower and upper plates disposed one above the other in a vertically aligned relation and forming a hot press, and reference symbol E depicts a conveyer which is movable in a controllably reciprocating manner as indicated by double-headed arrow. In this embodiment, the upper plate 5 is heated to about 190° C. by steam or electrical heater and movable toward and away from the lower plate 3 which is stationary and not heated. These plates 3 and 5 are substantially of the same size, having the same lengthwise and widthwise dimensions as the veneer sheet.

Figure 1A:
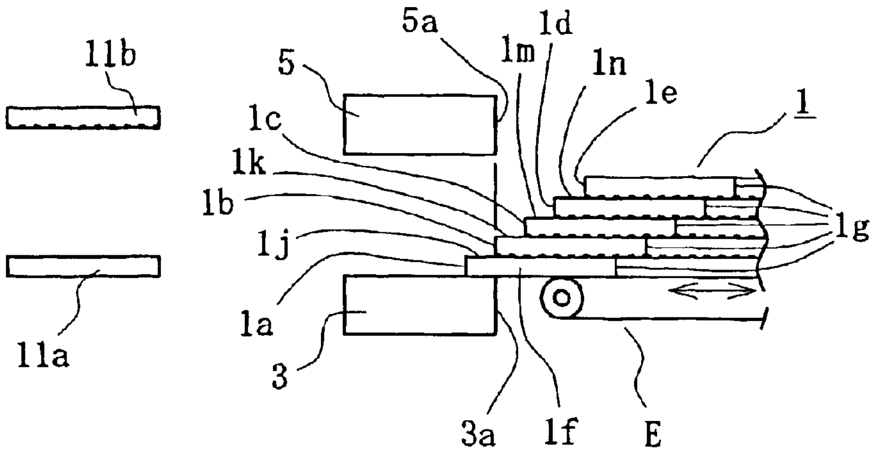
FIGS. 1A through 1C, 2A through 2C, 3A through 3C and 4A and 4B are schematic illustrative views showing a first embodiment of the present invention.

Referring to FIG. 1A, reference numeral 1 designates a veneer stack assembly of five-layer configuration as an initial base material from one end of which a continuous length of LVL board is to be made. The stack assembly 1 is made of a plurality of veneer sheets 1*f* which are laid and glued together or otherwise secured in such a regular staggered arrangement that the end joints 1*g* in any two adjacent layers of veneer sheets 1*f* are spaced by about 100 mm so that one end of the assembly 1 is shaped in the form of a flight of steps ascending from the lowermost layer protruding most outwards as shown in FIG. 1A. Such stack assembly 1 of veneer sheets 1*f* is prepared previously and supported on the conveyer E to be moved thereby toward and away from the plates 3 and 5 of the hot press.

The veneer stack assembly 1 as the initial base material may be made in any convenient way, for example, by manually stacking the veneer sheets 1*f* in the staggered arrangement and fixing them by means of adhesive. If the stack assembly 1 is not to be used as part of the finished product, fixing of veneer sheet may be accomplished by nailing, using pressure sensitive adhesive double-coated tape, or any other suitable methods. Alternatively, the initial base material may be made of any material other than veneer sheets, e.g. a block or blocks of solid wood available by sawing and shaped to have at one end thereof the desired form of a flight of steps. The same holds true of the veneer stack assemblies used in other embodiments which will be described hereinafter.

In the description of the embodiment, the lowermost layer of the stack assembly 1 will be referred to as the first layer and the other layers will be named accordingly, so that the top layer is the fifth in the case of the assembly 1 for the first embodiment. In FIG. 1A, reference symbols 1*a*, 1*b*, 1*c*, 1*d* and 1*e* depict a series of exposed end faces of veneer sheets in the first, second, third, fourth and fifth layers, respectively, and these end faces are formed perpendicularly with respect to the top and bottom surfaces of the veneer stack assembly 1 are spaced from one another at an interval of about 100 mm by a series of exposed top surfaces 1*j*, 1*k*, 1*m* and 1*n* of veneer sheets in the first, second, third and fourth layers of the veneer stack assembly 1 which are formed in parallel to the top and bottom surfaces of the stack assembly 1. That is, each of the top surfaces 1*j*, 1*k*, 1*m* and 1*n* has a lengthwise dimension of about 100 mm that is smaller than the length of veneer sheets for lamination which will be described below. Since each of the veneer sheets 1*f* for the initial base material 1 has substantially the same thickness as the veneer sheets for lamination, the height of the end faces 1*a*, 1*b*, 1*c*, 1*d* and 1*e* substantially corresponds to the thickness of the latter veneer sheets. This holds true of the other embodiments.

Reference symbols 11*a* and 11*b* in FIG. 1A designate veneer sheets to be added for lamination to the veneer stack assembly 1. The dotted line shown at the bottom of the veneer sheet 11*b* represents adhesive-coated surface, and the same is true of any other veneer sheets shown with such dotted line in the other embodiments. As an adhesive for use, a thermosetting adhesive such as phenolic resin is preferred. Other preferred thermosetting adhesives include phenolic, resorcinol, melamine and urea resins. Adhesive may be coated to the surface of veneer sheet just before the sheet is laid or, alternatively, adhesive coating on veneer sheet may be left as it is under a room temperature for a couple of hours to be dried.

In the initial state of apparatus for performing the method of the first preferred embodiment, the upper heat plate 5 is placed in its retracted upper position and the veneer stack assembly 1 carried on the conveyer E is placed at a position where the exposed end face 1*b* of veneer sheet in the second layer of the stack assembly 1 is in vertical alignment with the end faces 3*a* and 5*a* of the plates 3 and 5, as shown in FIG. 1A. Veneer sheets 11*a* and 11*b* are prepared at any appropriate positions, respectively.

Figure 1B:
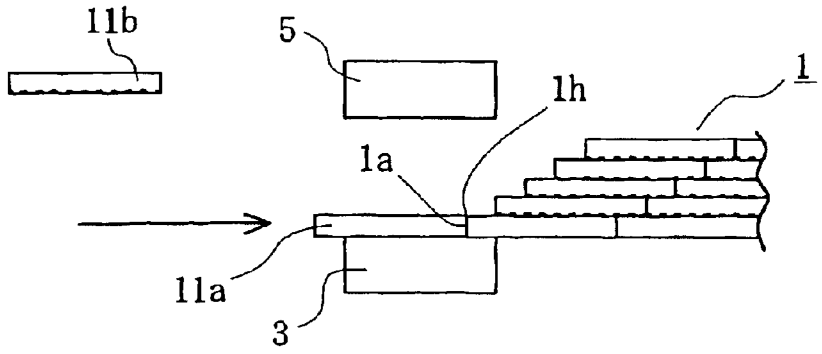

In the first step, the veneer sheet 11*a* is fed as indicated by arrow onto the lower stationary plate 3 with the right end face thereof, as view in drawing, in abutment with the exposed end face 1*a* of the veneer sheet in the first layer of the veneer stack assembly 1 thereby to form an end joint 1*h*, as shown in FIG. 1B.

Figure 1C:
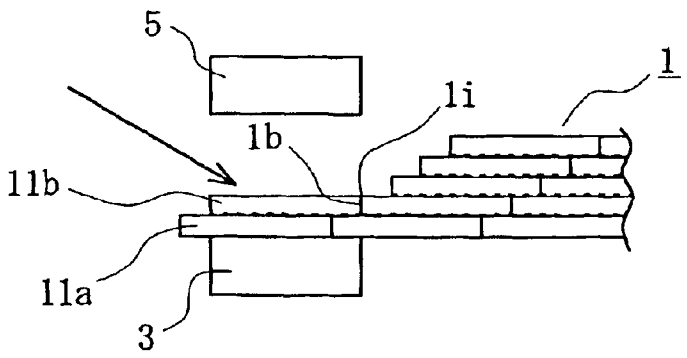

Then, the second veneer sheet 11*b* having its lower surface coated with adhesive is fed as indicated by arrow to be stacked onto and across the top surface of veneer sheets 11*a* and the top exposed surface 1*j* of veneer sheet in the first layer of the stack assembly 1 with the right end face of the sheet 11*b* placed in abutment with the exposed end face 1*b* of veneer sheet in the second layer of the stack assembly 1. Thus, an end joint 1*i* is formed, as shown in FIG. 1C.

Figure 2A:
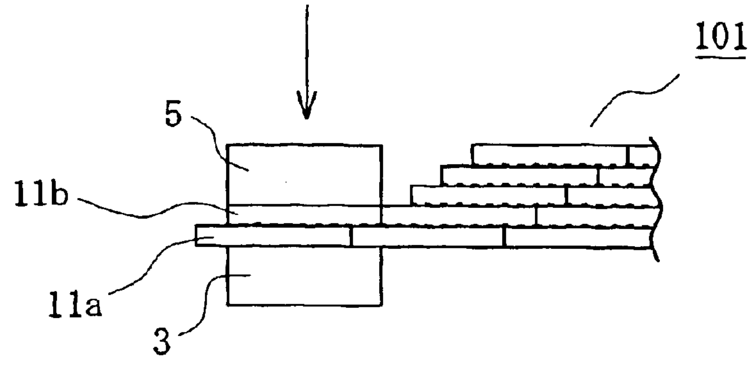

After the veneer sheets 11*a* and 11*b* have bee thus laid up, the upper heat plate 5 is lowered to hot press the veneer sheet 11*b* against the top surface of the veneer sheet 11*a* and the surface 1*j* of veneer sheet in the stack assembly 1 in conjunction with the stationary lower plate 3, as shown in FIG. 2A, with a pressure of about 1 MPa. Hot pressing is continued for about three minutes, whereby a laminated veneer stack assembly 101 is formed. The hot pressing conditions including the pressure, heat and the length of hot pressing time may be selected depending on various conditions such as veneer sheet thickness so that the adhesive is cured sufficiently to ensure the desired bonding strength.

As is appreciated from FIG. 2A, the veneer sheet 11*b* with its lower adhesive-coated surface placed in contact with the respective top surfaces of veneer sheets 11*a* and veneer sheet in the first layer of the stack assembly 1 receives uniform pressure over its entire top surface from the heat plate 5, while the entirety of the same veneer sheet 11*b* being steadily supported at the bottom by the lower stationary plate 3 via the veneer sheet 11*a* and veneer sheets in the first layer of the stack assembly 1. Thus, the veneer sheet 11*b* can be laminated securely to the veneer sheet 11*a* and to the stack assembly 1.

Figure 2B:
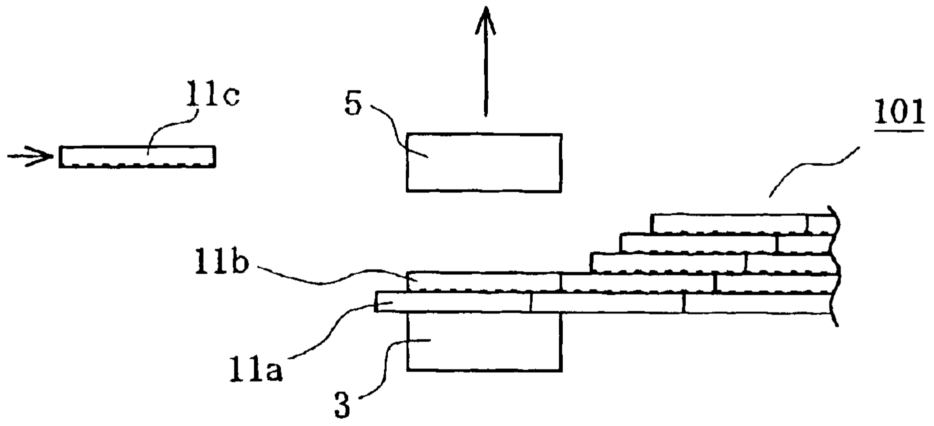

After an elapse of about three minutes of hot pressing, the heat plate 5 is elevated to its original position and a next veneer sheet 11*c* having on its lower surface an adhesive coating is prepared, as shown in FIG. 2B.

Figure 2C:
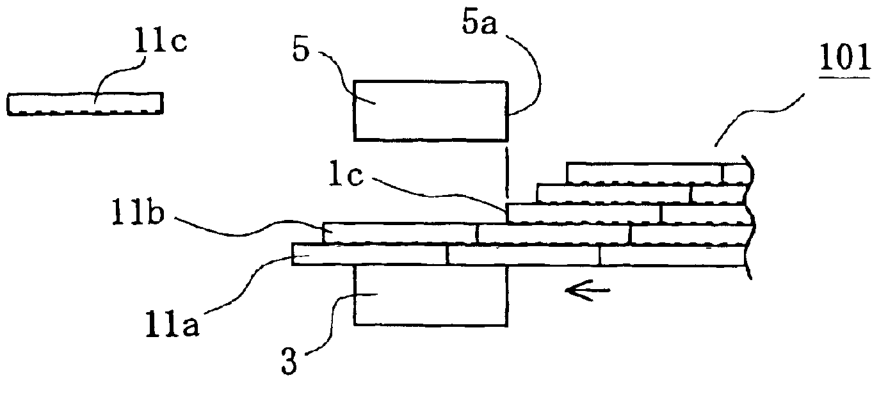

After the heat plate 5 has been elevated, the conveyer E is operated to move the veneer stack assembly 101 leftwards as indicated by arrow for a distance of about 100 mm so as to bring the exposed end face 1*c* of veneer sheet in the third layer into vertical alignment with the end face 5*a* of the upper heat plate 5, as shown in FIG. 2C.

Figure 3A:
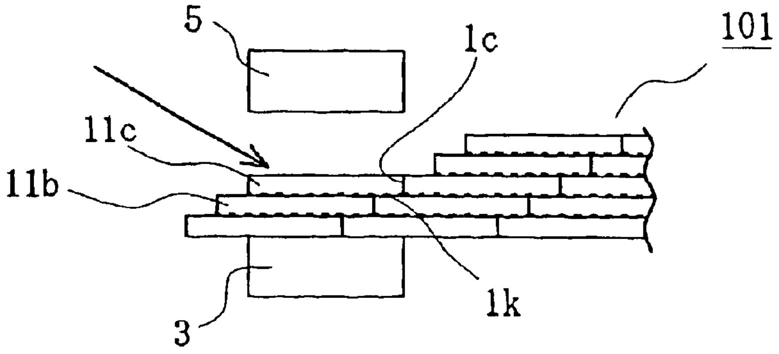

With the veneer stack assembly 101 positioned as shown in FIG. 2C, the veneer sheet 11*c* is fed and laid onto and across the top surface of veneer sheets 11*b* and the top exposed surface 1*k* of veneer sheet in the second layer of the veneer stack assembly 101 with the right end face of the sheet 11*c* placed in abutment with the exposed end face 1*c* of veneer sheet in the third layer, as shown in FIG. 3A.

Figure 3B:
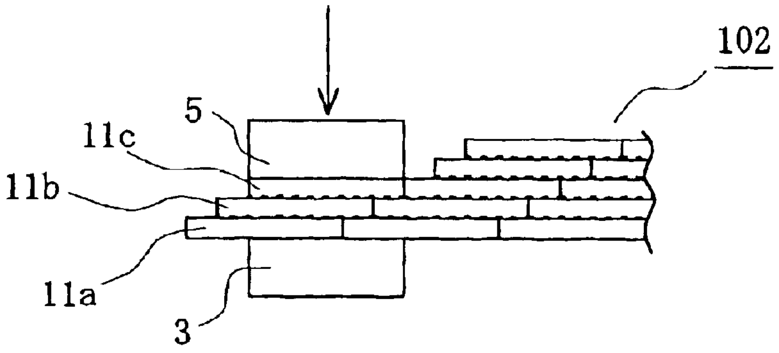

Then, the upper heat plate 5 is lowered to hot press the veneer sheet 11*c* in conjunction with the stationary lower plate 3 under the same hot pressing condition, whereby a laminated veneer stack assembly 102 is formed, as shown in FIG. 3B.

In this hot pressing, the veneer sheet 11*c* can be pressed over its entire surface by the heat plate 5 while being supported at the bottom over its entire surface by the lower stationary plate 3 via two layers of veneer sheets, so that the entire veneer sheet 11*c* receives pressure uniformly and, therefore, tight bonding thereof to the stack assembly 101 can be accomplished.

Figure 3C:
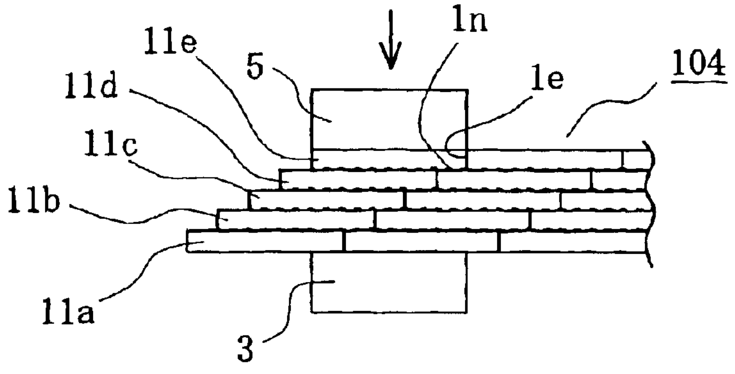

After the veneer stack assembly 102 has been thus formed, a veneer sheet 11*d* for the fourth layer and a veneer sheet 11*e* for the fifth layer are added successively for lamination in the same manner as described above, thus a laminated veneer stack assembly 104 being made, as shown in FIG. 3C. For the same reason as described earlier, these veneer sheets 11*d* and 11*e* can be pressed over the entire surface so that they are glued securely to the previously formed respective veneer stack assemblies.

Figure 4A:
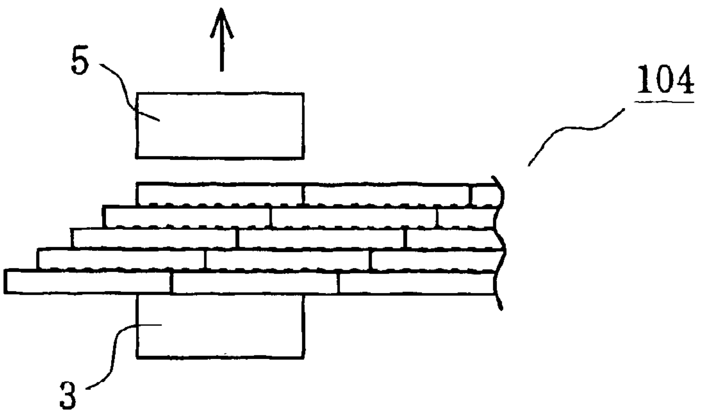
Figure 4B:
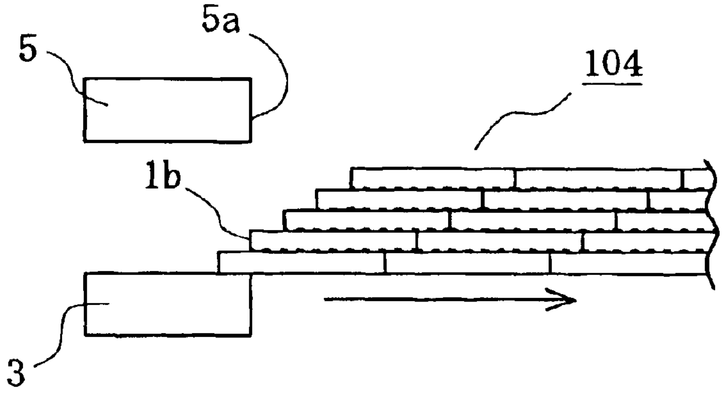

After laminating the veneer sheet 11*e*, the upper heat plate 5 is elevated to its retracted position as shown in FIG. 4A. Subsequently, the conveyer E is operated then to move the veneer stack assembly 104 rightwards as indicated by arrow in FIG. 4B until the exposed end face of veneer sheet in the second layer of the veneer stack assembly 104 comes in alignment with the end face 5*a* of the upper heat plate 5, as shown in FIG. 4B. As appreciated from comparison of FIG. 4B with FIG. 1A, the form of the left end portion of the veneer stack assembly 104 is similar to that of the initial base material 1, and the left end of the stack assembly 104 is located in the same relation to the hot press as the end of the initial base material 1 to the hot press in FIG. 1A. Thus, the stack assembly 104 may used as a new base material for the subsequent veneer sheet laminating operation.

From the state of FIG. 4B, a series of steps of operation as described with reference to FIG. 1B to FIG. 4B is repeated as many times as required to produce the desired length of five-layered LVL board. The resulting LVL board may ripped to the desired with or cut to the desired length depending on the application thereof.

As is now appreciated from the foregoing description of the first preferred embodiment, a veneer sheet having on its lower surface coated with adhesive and laid in place for lamination can be pressed in its entirety by the heat plate 5 while being supported firmly from the bottom by the lower stationary plate 3, so that the veneer sheet receives heat and pressure uniformly over its entire surface and, therefore, bonding of the veneer sheet for successful lamination can be accomplished.

Additionally, in the above embodiment, lamination of veneer sheets for production of glued laminated wood with the desired thickness and length can be made possible by the use of a single stage of hot press in conjunction with the reciprocable conveyer E. Thus, the apparatus for performing the method of the invention can be made with less cost as compared with the prior art apparatus.

Now referring to FIGS. 5 through 18, the second preferred embodiment of the present invention will be described in the following. This second embodiment differs from the first embodiment in that the lower plate 3 of the hot press is substituted by a heat plate which is movable toward and away from its counterpart heat plate 5 and also that a plurality of veneer sheets laid in place can be laminated simultaneously to a veneer stack assembly.

Figure 5:
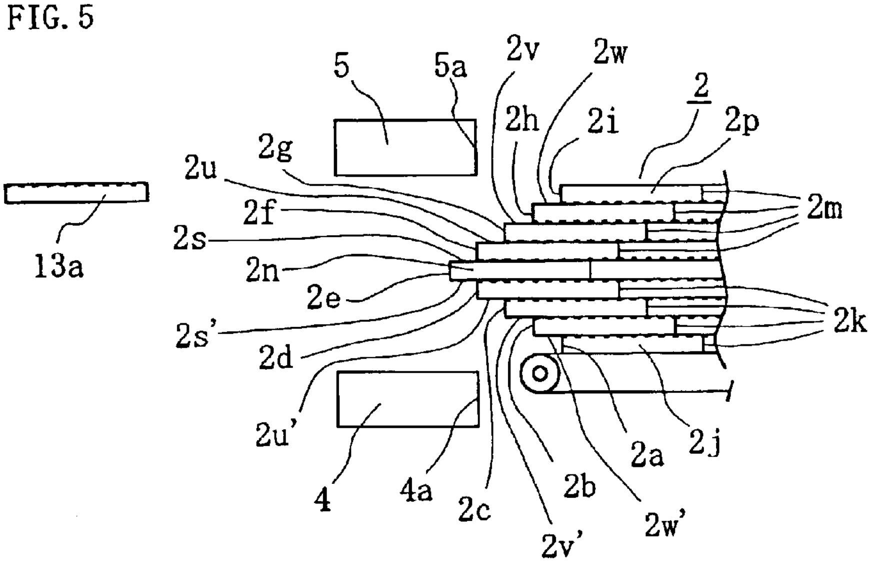
FIGS. 5 through 18 are schematic illustrative views showing a second embodiment of the invention.

Reference numeral 2 in FIG. 5 designates a veneer stack assembly as an initial base material made of a plurality of veneer sheets glued together in a staggered array with an offset distance of about 100 mm. As is apparent from comparison with the veneer stack assembly 1 of FIG. 1, the assembly 2 is of a nine-layered structure, in which the fifth center layer protrudes most outwards from the veneer stack assembly 2 and four layers of veneer sheets are laminated on the opposite sides of the fifth layer, respectively, symmetrically with respect to an imaginary center line passing longitudinally through the veneer sheets in the fifth layer. Thus, the end portion of the veneer stack assembly 2 is shaped in the form of two flights of steps ascending and descending from the center fifth layer, respectively.

In FIG. 5, reference symbols 2*a*, 2*b*, 2*c*, 2*d*, 2*e*, 2*f*, 2*g*, 2*h* and 2*i* designate the exposed end faces of veneer sheet in the first, second, third, fourth, fifth, sixth, seventh, eighth and ninth layers, respectively, of the veneer stack assembly 2 as the initial base material. On the other hand, reference symbols 2*s*, 2*u*, 2*v* and 2*w* designate upwardly facing exposed surfaces of veneer sheet in the fifth, sixth, seventh, eighth and ninth layers, respectively, while reference symbols 2*s*', 2*u*', 2*v*' and 2*w*' designate downwardly facing exposed surfaces of veneer sheets in the fifth, fourth, third, second and first layers, respectively. Any two adjacent exposed end faces 2*a*, 2*b*, 2*c*, 2*d*, 2*e*, 2*f*, 2*g*, 2*h*, 2*i* of veneer sheets are spaced by the upper or lower exposes surface 2*s*, 2*u*, 2*v*, 2*w* or 2*s*', 2*u*', 2*v*', 2*w*' between such two end faces at a distance of about 100 mm. In the drawing, reference symbols 2*m* and 2*k* depict end joints of veneer sheets in the upper four layers and end joints of veneer sheet in the lower four layers of the veneer stack assembly 2, respectively. As seen from the drawing, the end joints 2*m* and 2*k* are distributed symmetrically with respect to the fifth center layer of the assembly 2.

As in the case of the first embodiment, the veneer stack assembly 2 as the initial base material is supported and carried by the reciprocally movable conveyer E.

As stated earlier, in the second embodiment, there is provided a movable heat plate 4 in place of the stationary lower plate 3 of the first embodiment, which is also heated to about 190° C. by steam or electrical heater. The heat plate 4 is movable between its lower retracted position as shown, e.g. in FIG. 5 where it will not interfere with feeding motion of a veneer sheet and its elevated operative position as shown, e.g. in FIG. 7. The upper heat plate 5 is heated and movably disposed in the same manner as in the first embodiment. These two heat plates 4 and 5, which constitute a hot press, are disposed one above the other in vertically aligned relation with the right ends faces 4*a* and 5*a* located in a common imaginary vertical plane (not shown).

Reference symbol 13*a* designates a veneer sheet having its upper surface coated with thermosetting adhesive, as indicated by dotted line, and the above-described heat plates 4 and 5 have lengthwise and widthwise dimensions that are large enough to cover the entire surface area of such veneer sheet 13*a*.

In the initial state of the apparatus for performing the method of the second preferred embodiment, both heat plates 4 and 5 are retracted in their lower and upper inoperative positions, respectively, and the veneer stack assembly 2 carried on the conveyer E is placed at a position where the exposed end face 2*d* of veneer sheet in the fourth layer and the free end 2*f* of veneer sheet in the sixth layer are in vertical alignment with the end faces 4*a* and 5*a* of the heat plates 4 and 5, respectively, as shown in FIG. 5. The veneer sheet 13*a* for lamination to the stack assembly 2 is prepared and set at any convenient standby position.

Figure 6:
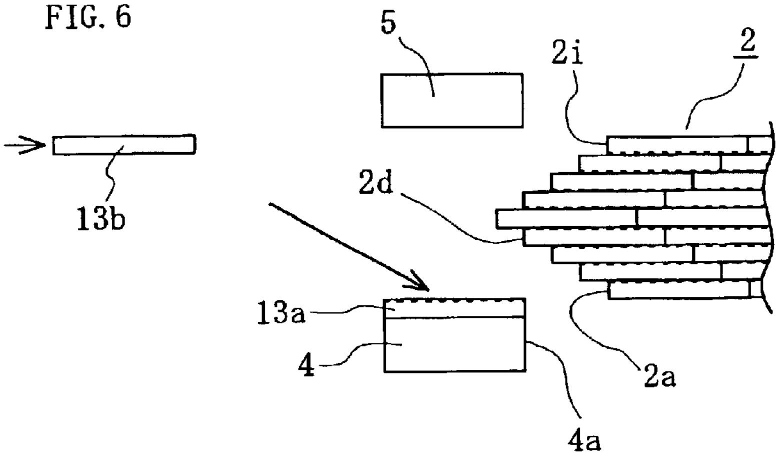

In the first step, the veneer sheet 13*a* is fed as indicated by arrow onto the upper surface of the lower heat plate 3 with its right end face in vertical alignment with the right end face 4*a* of the heat plate 4 and, simultaneously, a second veneer sheet 13*b* having no adhesive coating is prepared, as shown in FIG. 6.

Figure 7:
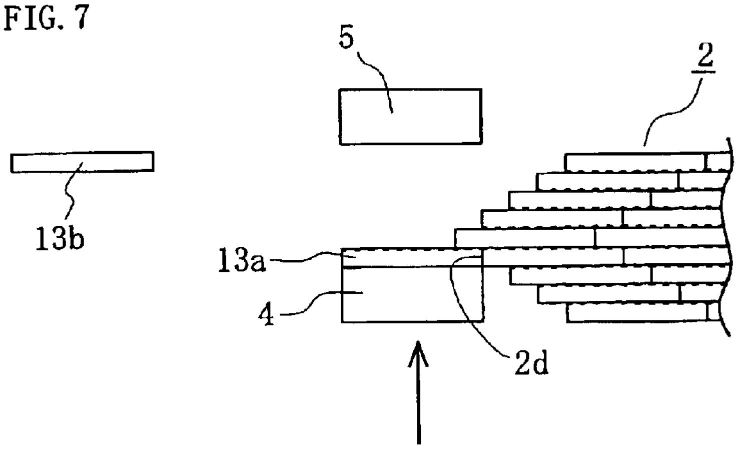

Then, the lower heat plate 4 is elevated to a position where the right end face of the veneer sheet 13*a* on the heat plate 4 comes into close abutment with the exposed end face 2*d* of veneer sheet in the fourth layer, as shown in FIG. 7.

Figure 8:
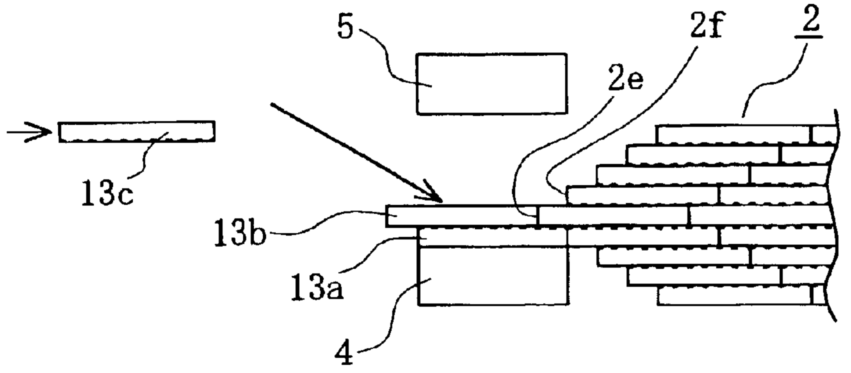

Subsequently, the second veneer sheet 13*b* is fed and laid onto the adhesive-coated upper surface of the veneer sheet 13*a* with the right end face of the former sheet 13*b* n close abutment with the exposed end face 2*e* of veneer sheet in the fifth layer of the veneer stack assembly 2, as shown in FIG. 8. Simultaneously, a third veneer sheet 13*c* with its lower surface coated with adhesive is prepared.

Figure 9:
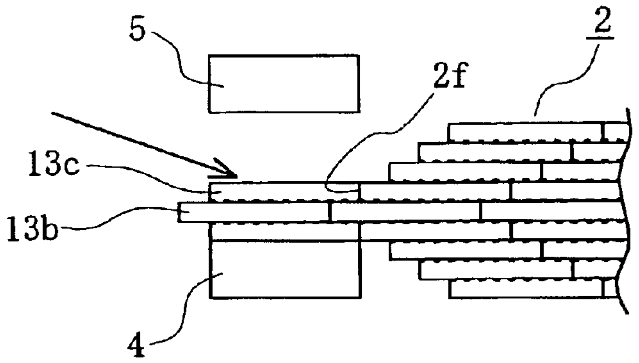

As shown in FIG. 9, the veneer sheet 13*c* is fed and laid on and across the top surface of the veneer sheet 13*b* and the exposed surface 2*s* of veneer sheet in the fifth layer of the stack assembly 2 with the right end face of the veneer sheet 13*c* in abutment with the exposed end face 2*f* of veneer sheet in the sixth layer of the veneer stack assembly 2.

Figure 10:
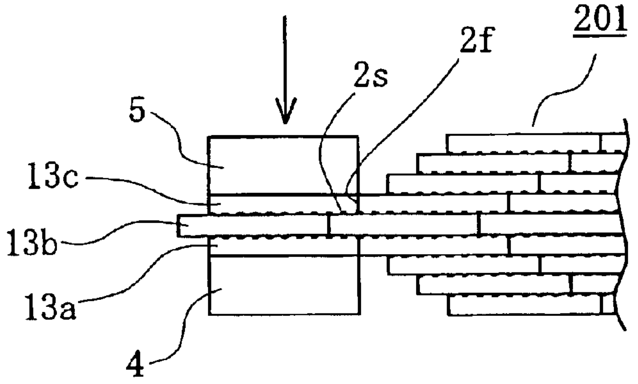

After these three veneer sheets 13*a*, 13*b* and 13*c* have been thus laid up, the upper heat plate 5 is lowered to hot press the three veneer sheets in conjunction with the lower heat plate 4, as shown in FIG. 10. Hot pressing is continued for about three minutes under a pressure of about 1 MPa. As seen from FIG. 10, the veneer sheets 13*a* and 13*c* are bonded to the intermediate veneer sheet 13*b* and also to protruded end portion of the veneer stack assembly 2, thus a veneer stack assembly 201 being formed. In this hot pressing, since the heat plates 4 and 5 are kept in pressing contact with the entire surfaces of veneer sheets 13*a* and 13*c*, the adhesive-coated surfaces of such veneer sheets receive uniform pressure from the heat plates, so that tight bonding can be achieved for successful lamination of veneer sheet to the stack assembly 2.

Some amount of heat is conducted to the veneer sheet 13*a* and hence to the adhesive on its top surface during the time from the moment when the veneer sheet 13*a* is placed on the heat plate 4 as shown in FIG. 6 before hot pressing is performed by both heat plates 4 and 5 as shown in FIG. 10. However, the above length of this time is so short that such heat will not badly affect the adhesive on the veneer sheet 13*a*.

Figure 11:
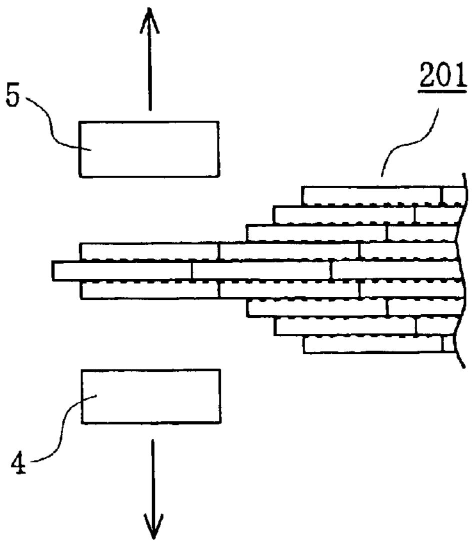
Figure 12:
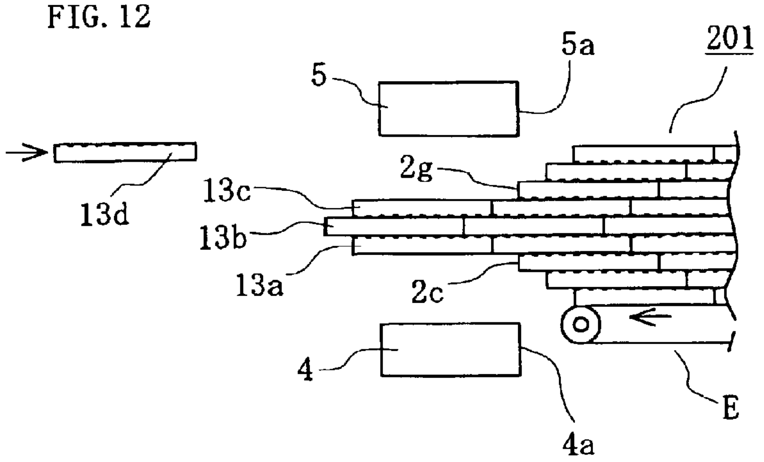

After three minutes have passed, both heat plates 4 and 5 are retracted to their inoperative positions, respectively, as shown in FIG. 11, and the conveyer E is then operated to move the veneer stack assembly 201 leftwards for about 100 mm as indicated by arrow so as to bring the exposed end faces 2*c* and 2*g* of veneer sheets in the third and seventh layers into vertical alignment with the end faces 4*a* and 5*a* of the heat plate 4 and 5, as shown in FIG. 12. Simultaneously, a fourth veneer sheet 13*d* having on its upper surface coated with adhesive is prepared, as shown in the same drawing.

Figure 13:
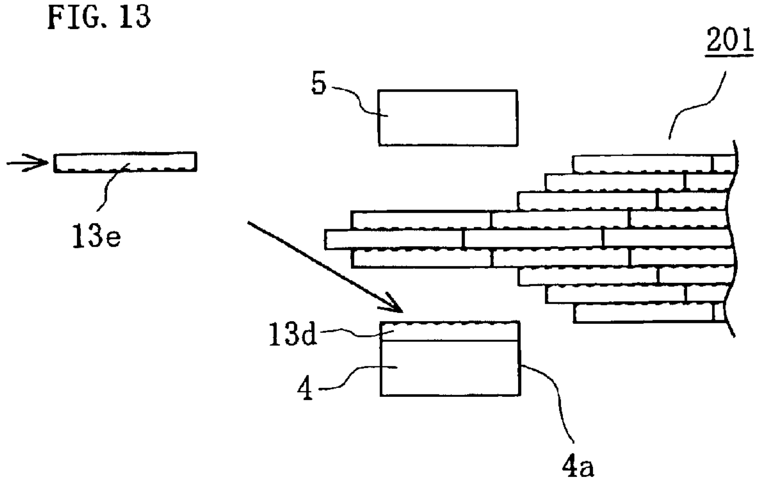

The veneer sheet 13*d* is fed onto the upper surface of the lower heat plate 3 in the same manner as in the case of the veneer sheet 13*a*, as shown in FIG. 13. Simultaneously, a fifth veneer sheet 13*e* having on its lower surface an adhesive coating is prepared.

Figure 14:
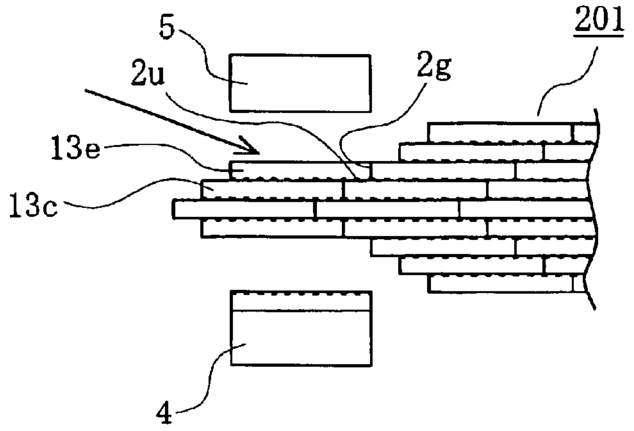

As shown in FIG. 14, the veneer sheet 13*e* is fed and placed on and across the upper surface of the veneer sheet 13*c* and the exposed surface 2*u* of veneer sheet in the sixth layer with the right end face thereof in abutment with the exposed end face 2*g* of veneer sheet in the seventh layer of the stack assembly 201.

Figure 15:
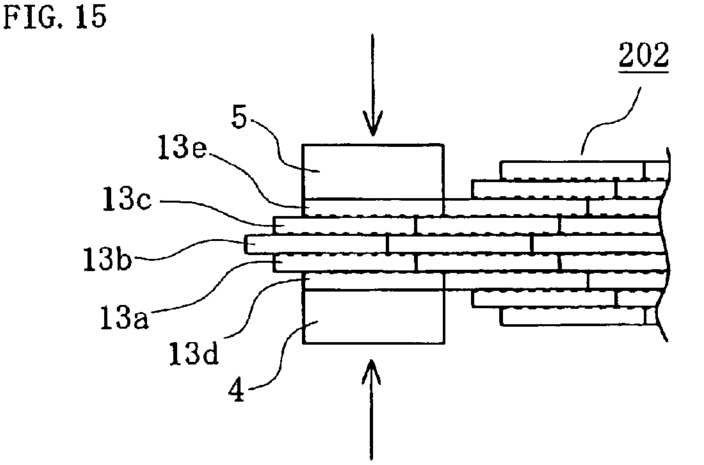

Then, the heat plates 4 and 5 are moved toward each other to their operative positions as shown in FIG. 15 to hot press the veneer sheets 13*d* and 13*e* to the previously laminated veneer sheets under the same conditions thereby to adhesively laminate these veneer sheets 13*d* and 13*e* to the stack assembly 201. Thus, a veneer stack assembly 202 is made.

As described earlier with reference to lamination of the veneer sheets 13*a*, 13*b* and 13*c*, tight bonding can be accomplished in this hot pressing because the entire upper and lower adhesive-coated surfaces of the veneer sheet 13*d* and 13*e* are pressed uniformly against the veneer stack assembly 201.

Repeating a series of steps similar to those steps as illustrated in FIGS. 12 through 15, sixth and seventh veneer sheets 13*f* and 13*g* are laminated to the veneer stack assembly 202 in the second and eighth layers thereof, thereby forming a veneer stack assembly 203 (not shown). Further repeating the similar steps, eighth and ninth veneer sheets 13*h* and 13*i* are added for lamination to the stack assembly 203 in the first and ninth layers thereof, thereby forming a laminated veneer stack assembly 204, as shown in FIG. 16.

Figure 17:
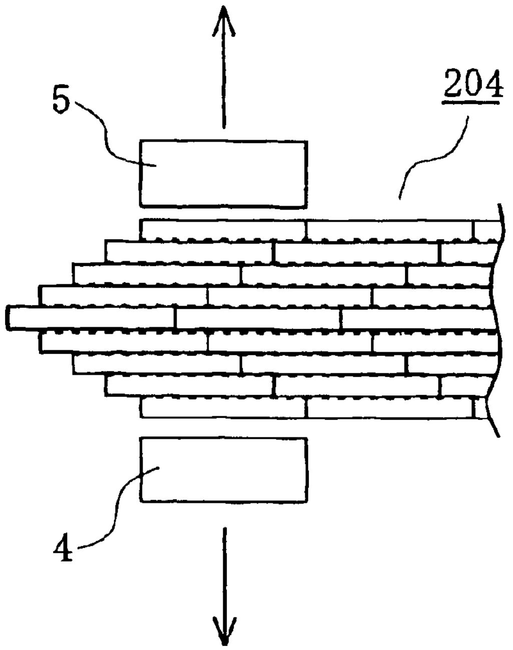
Figure 18:
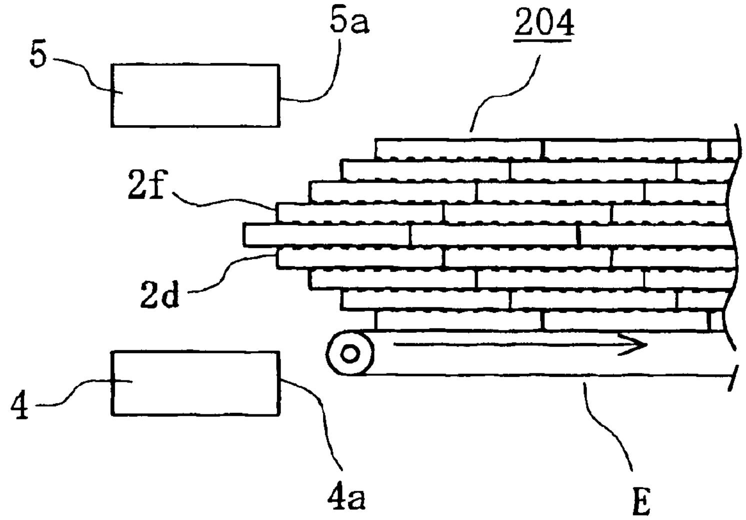

After the laminated veneer stack assembly 204 has been thus made, the heat plate 4 and 5 are retracted as shown in FIG. 17, which is followed by movement the conveyer E to shift the stack assembly 204 in arrow direction to a position where the exposed end face 2*d* of veneer sheet in the fourth layer and the exposed end face 2*f* of veneer sheet in the sixth layer in the veneer stack assembly 204 come in vertical alignment with the end faces 4*a* and 5*a* of the lower and upper heat plate 4 and 5, respectively, as shown in FIG. 18.

Figure 16:
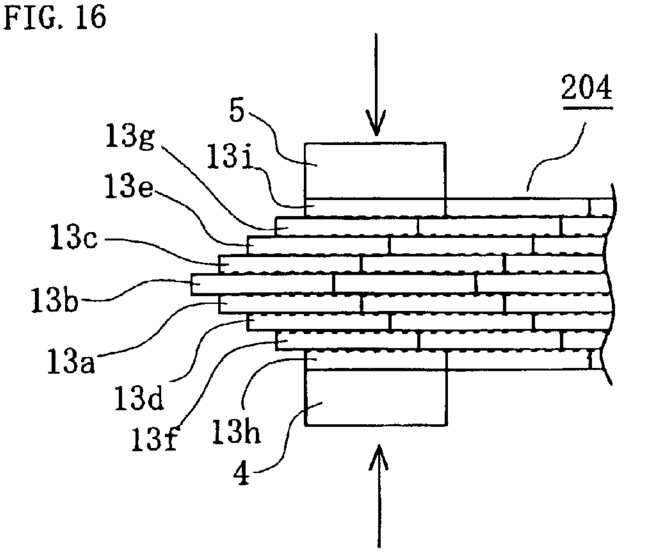

As described with reference to the first preferred embodiment, comparison of FIG. 16 and FIG. 5 shows that the form of the end portion of the veneer stack assembly 204 is similar to that of the initial veneer stack assembly 2, and the end of the stack assembly 204 is located in the same relation to the hot press as the end of the initial base material 2 to the hot press in FIG. 1A. Thus, the stack assembly 204 may used as a base material for the subsequent veneer sheet laminating operation.

A series of steps of operation as described with reference to FIGS. 6 through 18 is repeated as many times as required to produce the desired length of glued laminated wood or LVL board of nine-layer configuration. Depending on the application, the resulting LVL board may ripped to the desired with or cut to the desired length.

Laminating veneer sheets successively in the manner as described above, the end joints in the finished LVL board are distributed as shown, e.g. in FIG. 18. That is, the end joints are regularly staggered in the form of flights of steps which are symmetrical with respect to the center fifth layer. As seen in the drawings, the end joints in the first and ninth layers, second and eighth layers, third and seventh layers, and fourth and sixth layers are positioned in vertical alignment. Thus, two end joints in any two adjacent layers are not aligned with each other, but offset by a distance of about 100 mm, with the result that the resulting LVL board is strong enough against bending because the stress due to such bending does not tend to concentrate on a specific point in the board.

As is apparent to those skilled in the art, the above second preferred embodiment is advantageous in terms of working efficiency because two sheets of veneer can be laminated simultaneously by one stroke of hot pressing operation.

The following will now describe the third preferred embodiment of the invention while having reference to FIGS. 19 through 31.

The third embodiment is similar to the second embodiment in that two veneer sheets are laminated simultaneously by a single stroke of hot pressing operation, but it differs therefrom in that it is so designed that heat conduction to an adhesive-coated veneer sheet before hot pressing is minimized. To be more specific, the veneer sheet 13*a* with its upper surfaced coated with thermosetting adhesive is placed on the lower heat plate 4 and left as it is for a while in the second embodiment, as shown, e.g. in FIG. 6, and heat is conducted to the veneer sheet and hence to the adhesive while the veneer sheet is thus left on the heat plate 4. The method of the third embodiment is designed to minimize such heat conduction.

Figure 19:
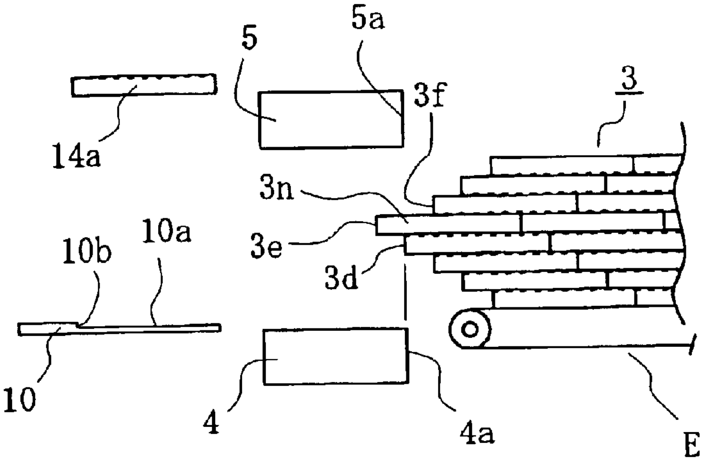
FIGS. 19 through 31 are schematic illustrative views showing a third embodiment of the invention.

Referring to FIG. 19, there is shown a veneer stack assembly 3 having an even number of layers, or eight layers, of veneer sheets as the initial base material and carried on the conveyer E, together with the lower and upper heat plates 4 and 5 movable toward and away from each other in the same manner as in the second embodiment. In the eight-layered veneer stack assembly 3, the exposed end 3*e* of veneer sheet 3*n* in the fifth layer projects most outwardly and veneer sheets in the fourth, third, second and first layers are disposed successively inwardly with an offset distance of about 100 mm. On the other hand, veneer sheet in the sixth layer of the veneer stack assembly 3 is disposed inwardly from the fifth-layer veneer sheet 3*n* such that its exposed end face 3*f* is spaced from the end face 3*e* by a distance of about 200 mm, and veneer sheets in the seventh and eighth layers are disposed further inwardly with an offset distance of about 100 mm so that they are aligned vertically with the veneer sheets in the second and first layers, respectively, as shown in FIG. 19.

Figure 22:
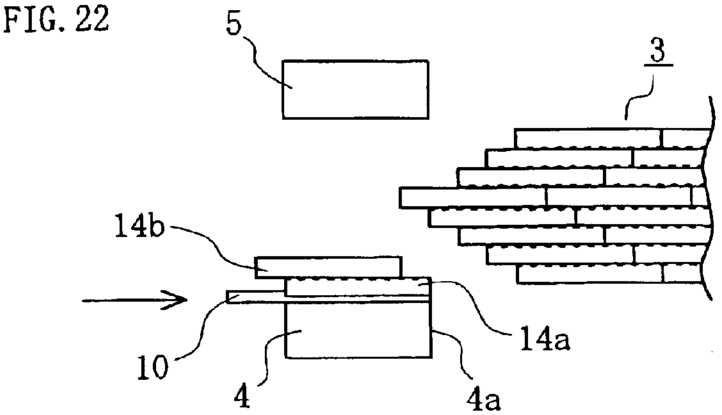

Reference numeral 10 designates a veneer carrier which is movable between its standby position shown in FIG. 19 and the operative position on the lower heat plate 4 shown in FIG. 22. The veneer carrier 10 is formed with a veneer sheet receiving surface 10*a* and a stepped portion 10*b* at a position about 1,000 mm as measured from the right end of the carrier 10 as seen in the drawing. The stepped portion 10*b* serves as a stop to locate a veneer sheet on the receiving surface 10*a*. The veneer carrier 10 is preferably made of a suitable heat conductive metal such as iron, aluminum or stainless steel.

In the initial state of apparatus for performing the method of the third preferred embodiment, the heat plates 4 and 5 are placed at their inoperative positions, and the veneer stack assembly 3 is located by the conveyer E at a position where the exposed end face 3*d* of veneer sheet in the fourth layer is in vertical alignment with the end faces 4*a* and 5*a* of the lower and upper heat plates 4 and 5, as shown in FIG. 19. A veneer sheet 14*a* with its upper surface coated with a thermosetting adhesive is prepared.

Figure 20:
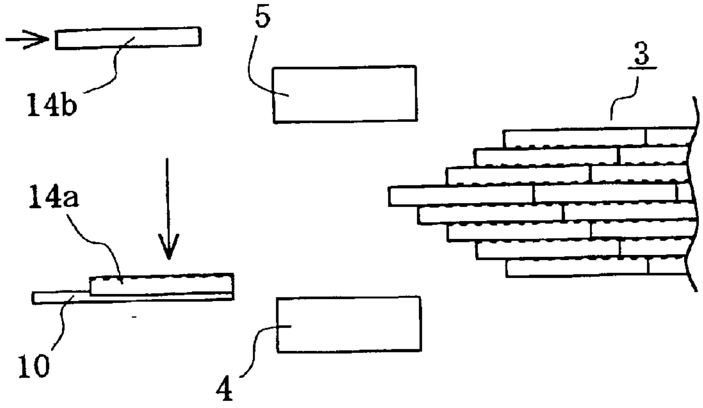

In the first step of operation, the veneer sheet 14*a* is fed as indicated by arrow onto the receiving surface 10*a* of the carrier 10 with the left end of the veneer sheet 14*a* located in abutment with the stepped portion 10*b* and, simultaneously, a second veneer sheet 14*b* having no adhesive coating is prepared, as shown in FIG. 20.

Figure 21:
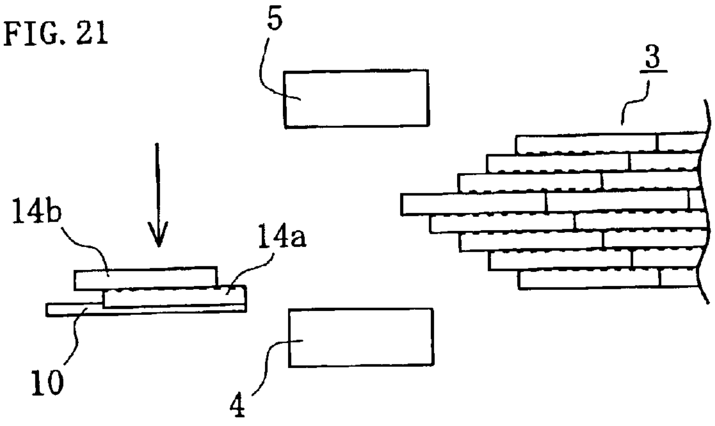

Then, the second veneer sheet 14*b* is fed and placed onto the adhesive-coated upper surface of the veneer sheet 14*a* such that the former veneer sheet 14*b* is offset leftward by a distance of about 100 mm, as shown in FIG. 21.

Subsequently, the carrier 10 is moved as indicated by arrow onto the upper surface of the lower heat plate 4 with the right end face of the carrier 10 and hence the right end face of the veneer sheet 14*a* positioned in vertical alignment with the right end face 4*a* of the heat plate 4, as shown in FIG. 22.

Figure 23:
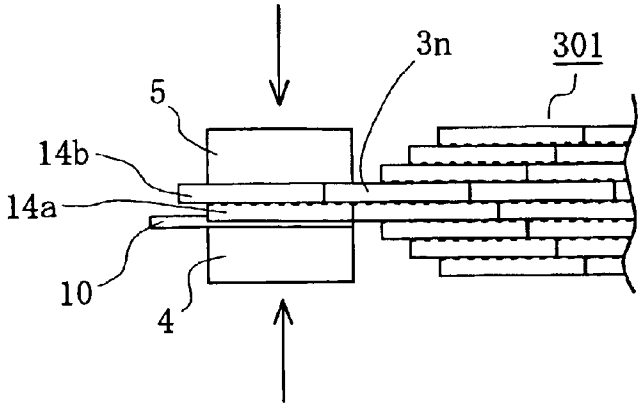

After the carrier 10 has been thus placed on the heat plate 4, the lower and upper heat plates 4 and 5 are moved to hot press the veneer sheets 14*a* and 14*b* and the protruding portion of the veneer sheet 3*n* of the veneer stack assembly 3, as shown in FIG. 23. Hot pressing is continued for about three minutes under a pressure of about 1 MPa, as a result of which the veneer sheets 14*a* and 14*b* are glued to the veneer stack assembly 3 and a veneer stack assembly 301 is formed. As is apparent from the drawing, heat from the heat plate 4 is conducted to the veneer sheets 14*a* and 14*b* through the metal carrier 10. In this hot pressing, the entire adhesive-coated surface of the veneer sheet 14*a* receives uniform pressure from the heat plates 4 and 5.

Figure 24:
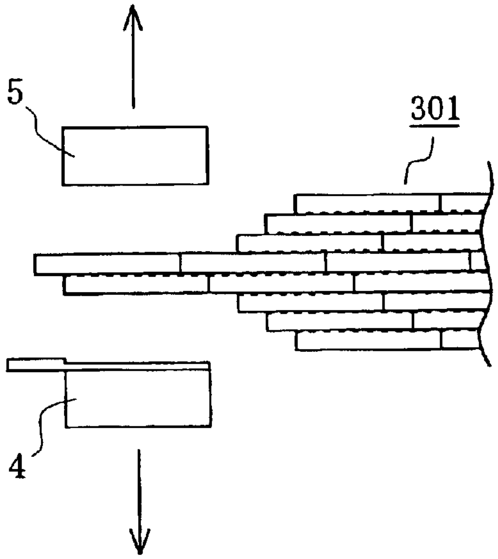
Figure 25:
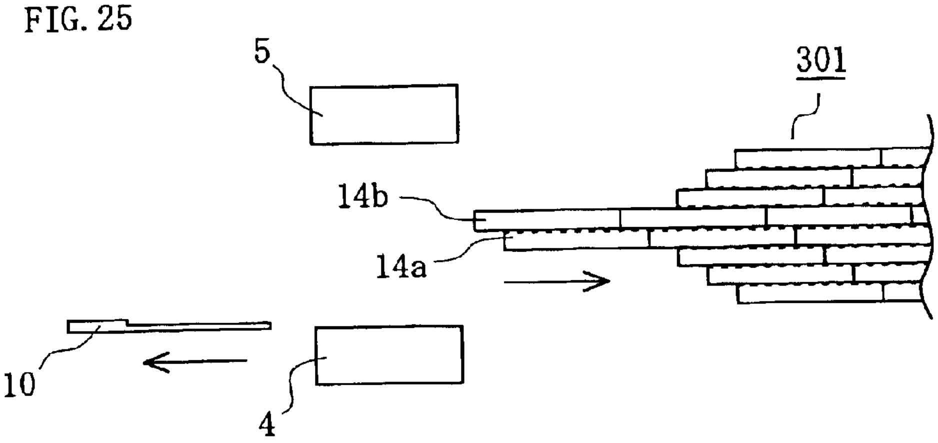

After three minutes of hot pressing, the heat plates 4 and 5 are retracted to their original positions, as shown in FIG. 24, and subsequently the conveyer E is operated to move the veneer stack assembly 301 rightwards and the carrier 10 is moved back to its standby position, as shown in FIG. 25.

Figure 26:
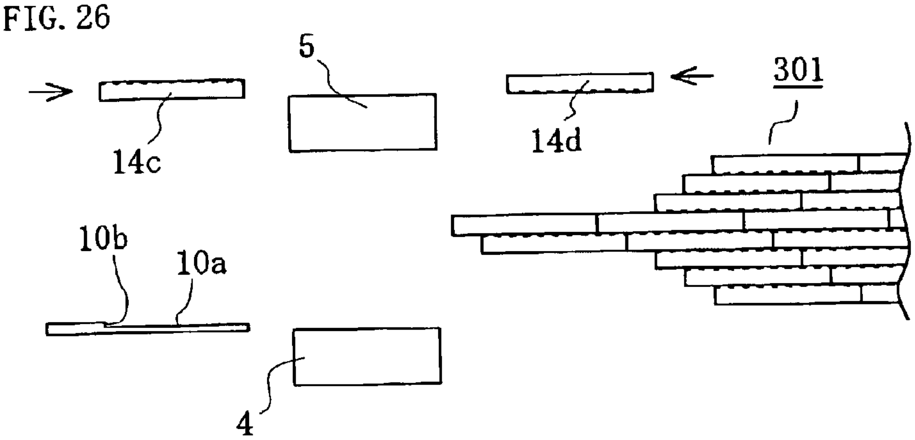

As shown in FIG. 26, a third veneer sheet 14*c* having its upper surface coated with adhesive and a fourth veneer sheet 14*d* having adhesive coating on its lower surface are prepared.

Figure 27:
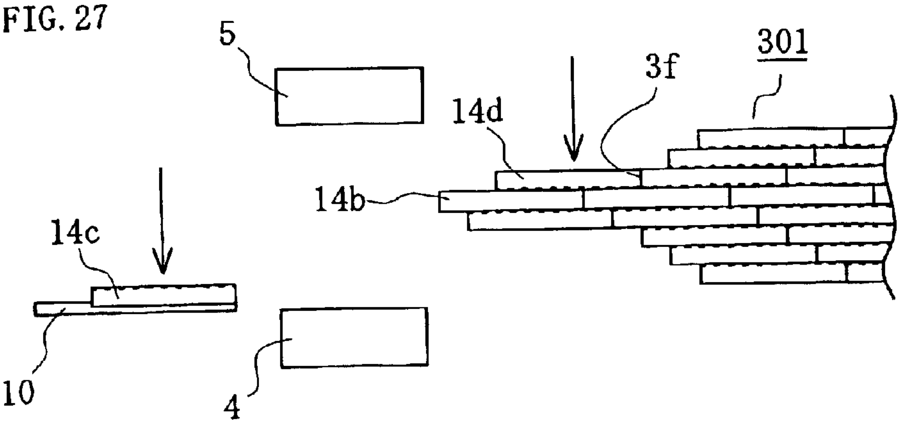

The veneer sheet 14*c* is placed onto the carrier 10 in the same manner as the veneer sheet 14*a* and the veneer sheet 14*d* is laid onto the stack assembly 301 with one end face thereof in abutment with the end face 3*f* of veneer sheet in the sixth layer of the stack assembly 301, as shown in FIG. 27.

Figure 28:
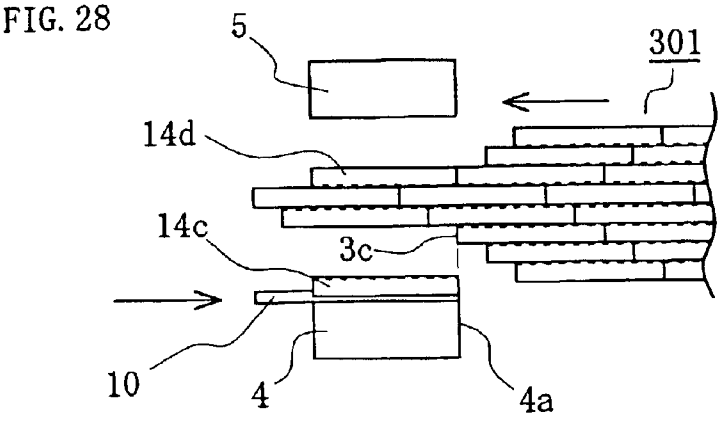

Then, the veneer stack assembly 301 is moved by the conveyer E to a position where the exposed end face 3*c* of veneer sheet in the third layer is in vertical alignment with the end face 4*a* of the lower heat plate 4, and the carrier 10 carrying thereon the veneer sheet 14*c* is moved onto the upper surface of the heat plate 4, as shown in FIG. 28.

Figure 29:
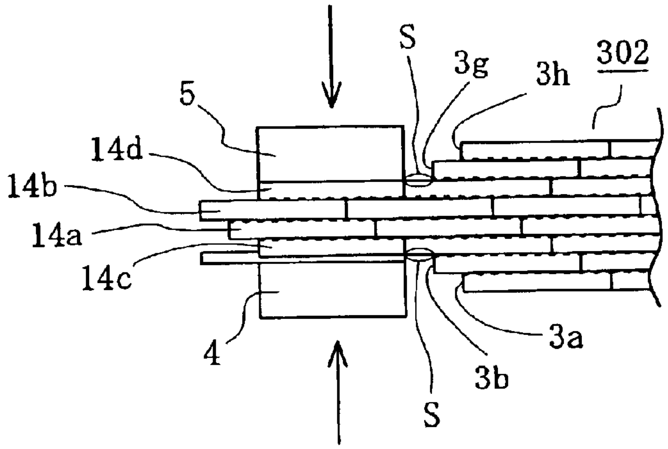

The heat plates 4 and 5 are activated to move toward each other to hot press the veneer sheets 14*c* and 14*d* to bond them to the stack assembly 301 under the same conditions, as shown in FIG. 29. Thus, a laminated veneer stack assembly 302 is formed.

Though not shown in the drawings, after the heat plates 4 and 5 are moved to their retracted positions, the veneer stack assembly 302 is moved by the conveyer E to a position where the end faces 3*b* and 3*g* of veneer sheets in the second and seventh layers of the stack assembly 302 are in vertical alignment with the end face 4*a* of the heat plate 4, and a fifth veneer sheet 14*e* having its upper surface coated with adhesive and a sixth veneer sheet 14*f* having its lower surface coated with adhesive are laminated to the stack assembly 302 in the same manner as described above with reference to veneer sheets 14*c* and 14*d*, thereby providing a laminated veneer stack assembly 303 (not shown).

Figure 30:
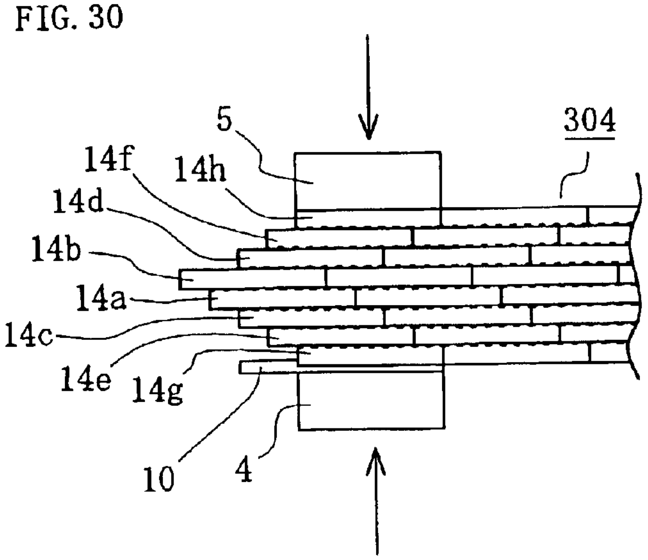

In FIG. 30, the veneer stack assembly 303 (not shown) is moved leftwards to a position where the exposed end faces 3*a* and 3*g* of veneer sheets in the first and eighth layers of the stack assembly 303 are in vertical alignment with the end face 4*a* of the heat plate 4, and a seventh veneer sheet 14*g* having its upper surface coated with adhesive and an eighth veneer sheet 14*h* having its lower surface coated with adhesive are laminated to the stack assembly 303 in the same manner as described above. Thus, a laminated veneer stack assembly 304 is formed as shown in FIG. 30.

Figure 31:
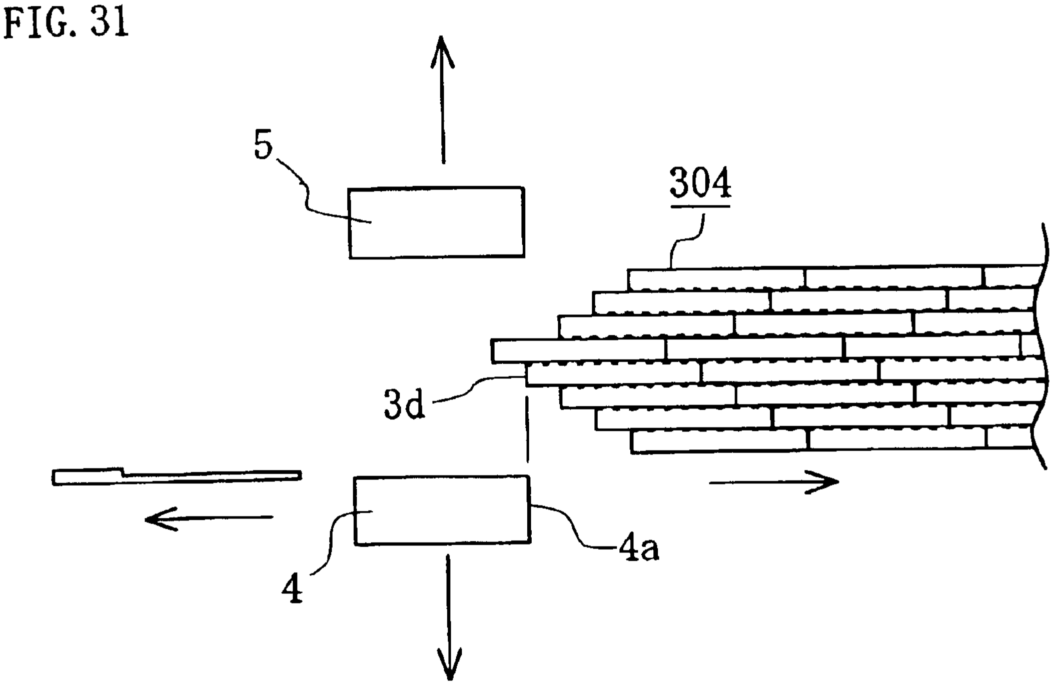

After the stack assembly 304 has been thus formed and the heat plates 4 and 5 have been retracted, the assembly 304 is moved rightwards by the conveyer E to a position where the exposed end face 3*d* of veneer sheet in the fourth layer is in vertically alignment with the end faces 4*a* of the lower heat plates 4, as shown in FIG. 31. That is, the veneer stack assembly 304 is placed in a position corresponding to the position of the initial stack assembly 3 with respect to the heat plates 4 and 5 in FIG. 19.

A series of steps of operation as described in FIGS. 20 through 31 is repeated as many times as required to produce the desired length of LVL board of eight-layer configuration.

In each of the above-described three different embodiments, the heat plates 4 and 5 have such a size that they can press only the entire surface of a single veneer sheet, as shown e.g. in FIGS. 3B, 15 and 29. For example in the case of FIG. 29, the lower heat plates 4 presses the entire surface of the veneer sheet 14*c* by way of the carrier 10 and the upper heat plate 5 is in direct pressing contact with the entire surface of the veneer sheet 14*d*. Such pressing causes the outer surfaces of the respective veneer sheets 14*c* and 14*d* to be heated to a high temperature and, therefore, part of the heat in such veneer sheets will be conducted to veneer sheets 14*e* and 14*f* when they are placed over such heated surfaces. That is, the veneer sheets 14*e* and 14*f* are not only heated by the heat plates 4 and 5, but also receive some amount of heat from the previously hot-pressed veneer sheets 14*c* and 14*d*. Such heating contributes to curing of adhesive on the veneer sheets 14*e* and 14*f*. It is to be noted, however, that areas designated by reference symbol S in FIG. 29 are not heated so much as the outer surfaces of veneer sheets 14*c* and 14*d*. Therefore, part of the adhesive coating on veneer sheets 14*e* and 14*f* which are in contact with the heated surfaces of veneer sheets 14*c* and 14*d* cures faster than the remaining adhesive coating on the same veneer sheets which are in contact with the areas S. In other words, the latter adhesive layers take longer time to be cured sufficiently for the desired bonding strength. For making a product with the desired strength, it is desirable that the entire adhesive coating on each veneer sheet should be hot pressed for complete curing of the adhesive. For this purpose, it is necessary for the heat plates 4 and 5 to be kept in their operative state for a longer time until the adhesive in contact with the areas S is cured sufficiently. However, this will only lengthen the pressing time and reduce the working efficiency of the apparatus, accordingly.

The fourth embodiment of the invention, which will be described in the following with reference to FIGS. 32 through 45, has been contemplated so as to avoid the above disadvantage.

Figure 32:
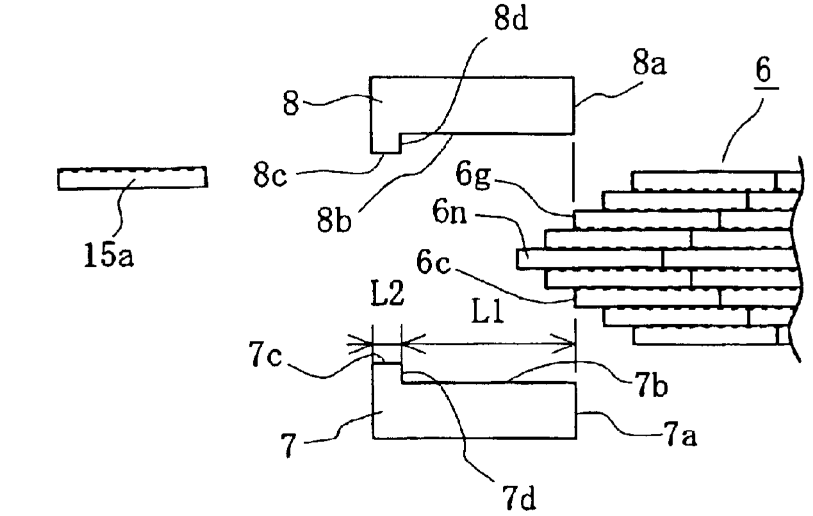
FIGS. 32 through 45 are schematic illustrative views showing a fourth embodiment of the invention.

Referring to FIG. 32, there is shown an initial veneer stack assembly 6 of nine-layered configuration arranged in the same manner as the initial veneer stack assembly 2 of FIG. 5 for the second preferred embodiment. Though not shown, the veneer stack assembly 6 is supported on the reciprocally movable conveyer E.

Reference numerals 7 and 8 designate a pair of lower and upper heat plates movable toward and away from each other in the same manner as the heat plates 4 and 5 in the above second and third embodiments. The lower heat plate 7 is L-shaped as seen in its longitudinal cross-section, as shown in FIG. 32, having a veneer sheet receiving surface 7*b* adjacent to the right end face 7*a* and an elevated surface 7*c* adjacent to the opposite end. Between the surfaces 7*b* and 7*c* is formed a vertical stepped surface 7*d*. The receiving surface 7*b* has a length L1 of about 1,100 mm which corresponds to the sum of 1,000 mm for the veneer sheet length and 100 mm for the offset distance between two end joints of any two adjacent layers of veneer sheets in the veneer stack assembly 6. The surface 7*c* has a length L2 of about 100 mm and the height of the stepped surface 7*d* is about 4 mm corresponding to the thickness of veneer sheet. The heat plate 7 is heated to about 190° C. by steam or electrical heater. The upper heat plate 8 is substantially of the same construction as the heat plate 7 and heated to the same temperature, having the surfaces 8*b*, 8*c* and 8*d* corresponding to the surfaces 7*b*, 7*c* and 7*d*, but disposed in upside down relation to the lower heat plate 7. That is, these heat plates 7 and 8 are disposed symmetrically with respect to an imaginary horizontal plane passing through the center of veneer sheets in the fifth layer of the stack assembly 6.

In the initial state of apparatus for performing the method of the fourth embodiment, both lower and upper heat plates 7 and 8 are placed in their retracted positions and the initial veneer stack assembly 6 is placed at a position where the exposed ends 6*c* and 6*g* of veneer sheets in the third and seventh layer are in vertical alignment with the end faces 7*a*, 8*a* of the heat plates 7, 8, as shown in FIG. 32. A veneer sheet 15*a* having on its top surface coated with thermosetting adhesive is prepared.

Figure 33:
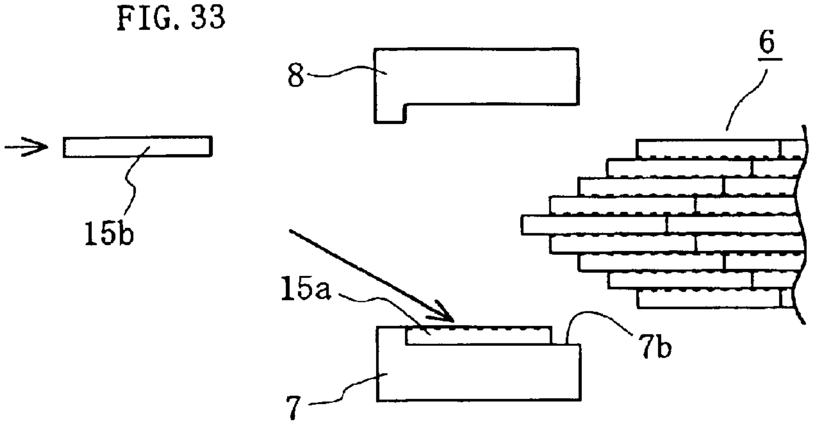

In the first step, the veneer sheet 15*a* is fed as indicated by arrow onto the receiving surface 7*b* of the lower heat plate 7 with the left end face thereof in contact with the vertical stepped surface 7*d*, as shown in FIG. 33. Simultaneously, a second veneer sheet 15*b* having no adhesive coating is prepared.

Figure 34:
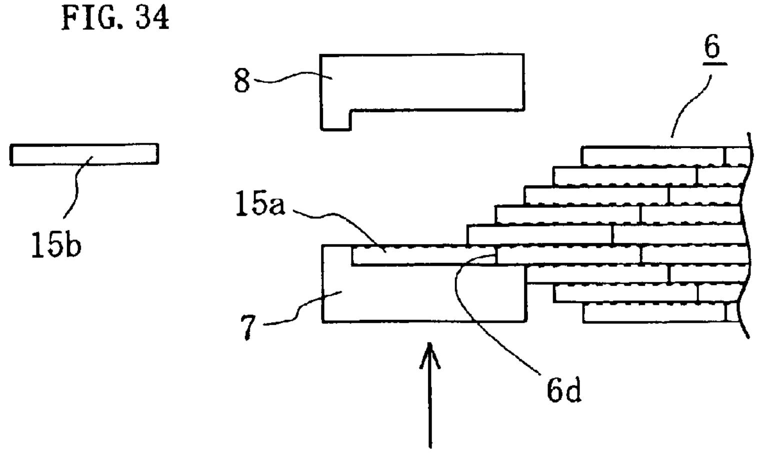

Then, the lower heat plate 7 is elevated to bring the right end face of the veneer sheet 15*a* on the heat plate 7 into abutment with the exposed end face 6*d* of veneer sheet in the fourth layer of the veneer stack assembly 6, as shown in FIG. 34.

Figure 35:
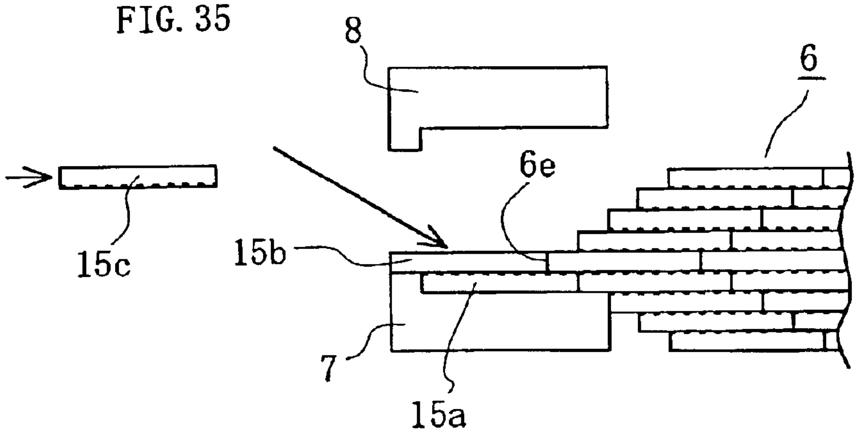

The second veneer sheet 15*b* is then fed and placed onto and across the top surface of the veneer sheet 15*a* and the surface 7*c* of the heat plate 7 with the right end face of the veneer sheet 15*b* in abutment with the exposed end face 6*e* of veneer sheet in the fifth layer of the stack assembly 6, as shown in FIG. 35. A third veneer sheet 15*c* having adhesive coating on its bottom surface is prepared.

Figure 36:
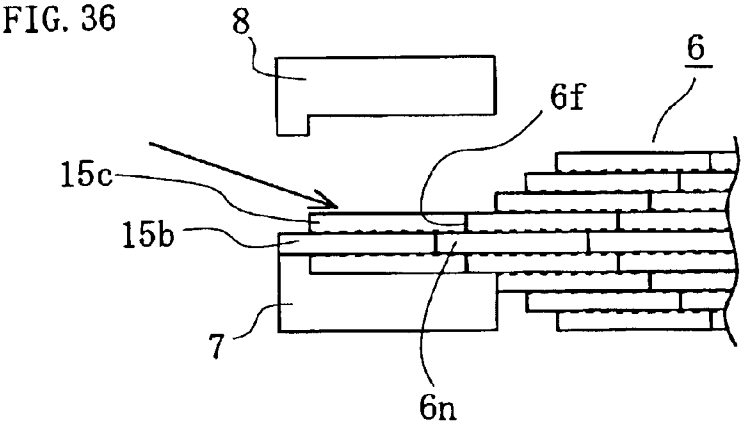

The veneer sheet 15*c* is fed and placed onto and across the upper surface of the veneer sheet 15*b* and the exposed upper surface of veneer sheet 6*n* with the right end face of the veneer sheet 15*c* in abutment with the exposed end face 6*f* of veneer sheet in the sixth layer of the stack assembly 6, as shown in FIG. 36.

Figure 37:
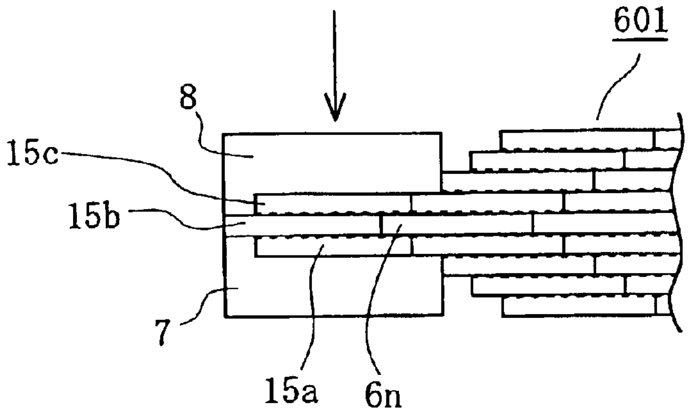

After these three veneer sheets 15*a*, 15*b* and 15*c* have been thus laid up, the heat plate 8 is moved downwards to hot press the veneer sheets, as shown in FIG. 37. Hot pressing is continued for about one minute under a pressure of about 1 MPa, thus a laminated veneer stack assembly 601 being formed. Since the effective pressing surface areas of the heat plates 7 and 8 correspond to the sums of areas of the surfaces 7*b*, 7*c* and 8*b*, 8*c*, respectively, a greater force is required to achieve the pressure of 1 MPa than in the case of the heat plates 3 and 5.

As seen from FIG. 37, the adhesive-coated veneer sheets 15*a* and 15*c* are pressed over their entire surfaces against the opposite surfaces of the intermediate veneer sheet 15*b* and the opposite surfaces of the projecting portion of the veneer sheet 6*n* of the veneer stack assembly 6. Simultaneously, the lower and upper exposed surfaces of veneer sheet in the fourth and sixth layers of the veneer stack assembly 6, as well as the respective outer surfaces of veneer sheets 15*a* and 15*c*, are kept in pressing contact with the heat plates 7 and 8 and hence heated.

Figure 38:
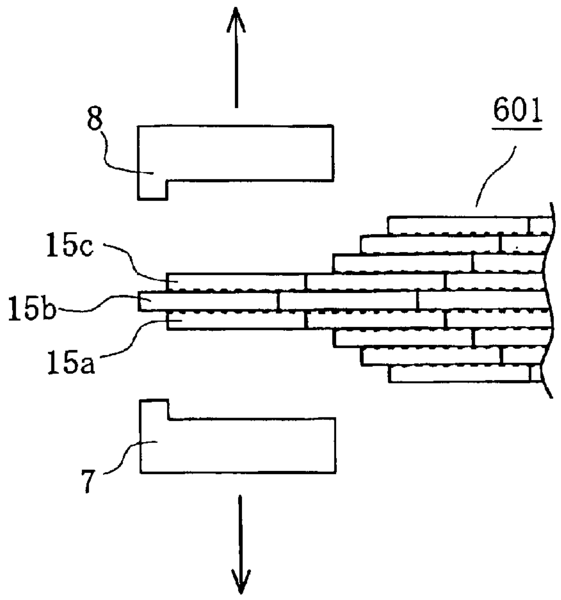

After about one minute of such hot pressing, both heat plates 7 and 8 are retracted to their inoperative positions, as shown in FIG. 38. Because one minute of hot pressing is rather short, the adhesive cannot be cured completely, although bonding by the adhesive is strong enough to hold the veneer sheets 15*a*, 15*b* and 15*c* to the stack assembly 6, so that these veneer sheets will not be separated from the assembly 6 when the heat plates 7 and 8 are moved away from the veneer sheets. It is noted here that curing of the adhesive continues after one minute of hot pressing because of the heat conducted from the heated veneer sheets 15*a* and 15*c*. It is also noted that the outer exposed surfaces of veneer sheets in the fourth and sixth layers of the veneer stack assembly 601 are kept in direct contact with the heat plates 7 and 8 and hence these surfaces are heated to a high temperature during this hot pressing. In this hot pressing, the projected surfaces 7*c* and 8*c* of the heat plates 7 and 8 provide no particular effect on the veneer sheet 15*b*.

Figure 39:
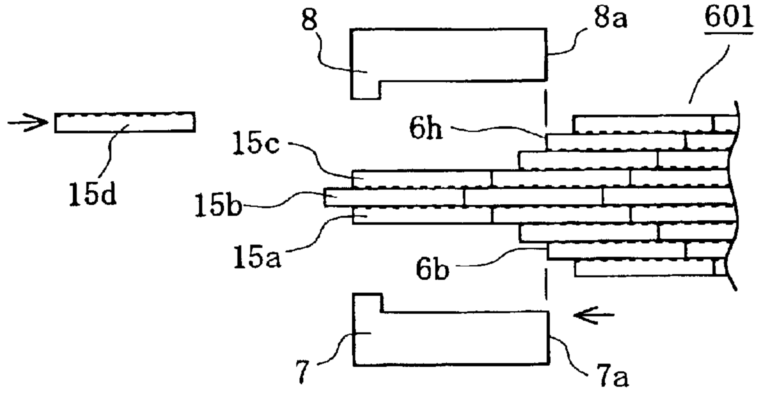

After retraction of the heat plates 7 and 8, the conveyer E (not shown) is operated to shift the veneer stack assembly 601 for 100 mm leftwards as indicated by arrow so that the exposed end faces 6*b* and 6*h* of veneer sheets in the second and eighth layers of the stack assembly 601 are brought into vertical alignment with the end faces 7*a* and 8*a* of the heat plate 7 and 8, as shown in FIG. 39. Simultaneously, a fourth veneer sheet 15*d* with its top surface coated with adhesive is prepared as shown in the same drawing.

Figure 40:
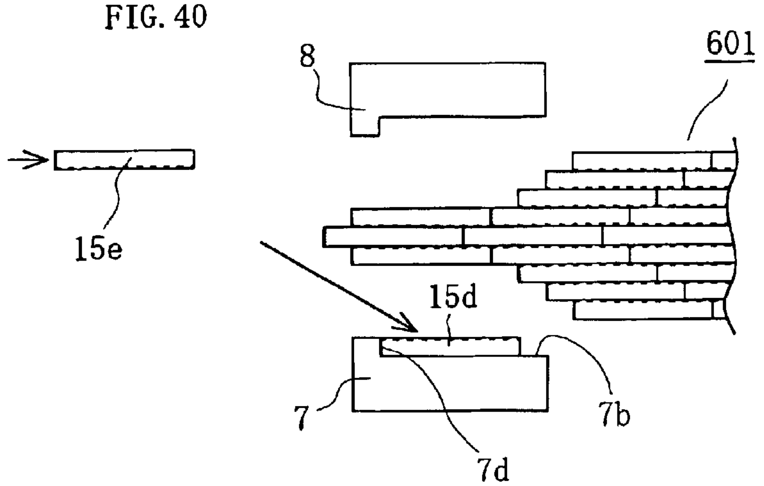

Then, the veneer sheet 15*d* is fed as indicated by arrow onto the receiving surface 7*b* of the lower heat plate 7 in the same manner as the veneer sheet 15*a* and, simultaneously, a fifth veneer sheet 15*e* having on its lower surface a adhesive coating is prepared, as shown in FIG. 40.

Figure 41:
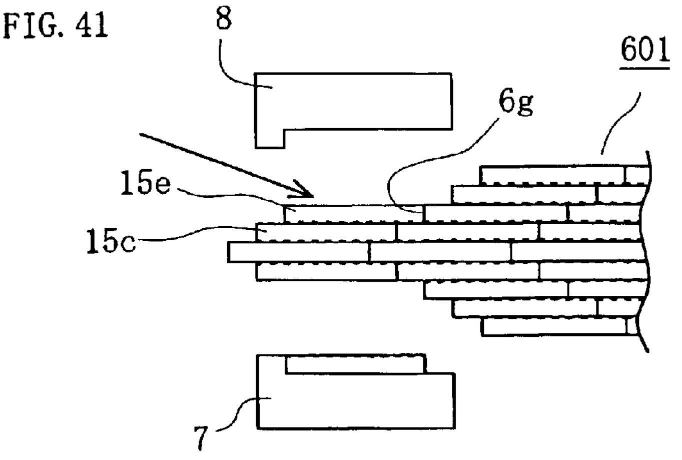

The veneer sheet 15*e* is fed and laid onto and across the heated upper surface of the veneer sheet 15*c* and its adjacent exposed surface of veneer sheet in the sixth layer with the right end face of the veneer sheet 15*e* in abutment with the exposed end face 6*g* of veneer sheet in the seventh layer of veneer sheet of the stack assembly 601, as shown in FIG. 41.

Figure 42:
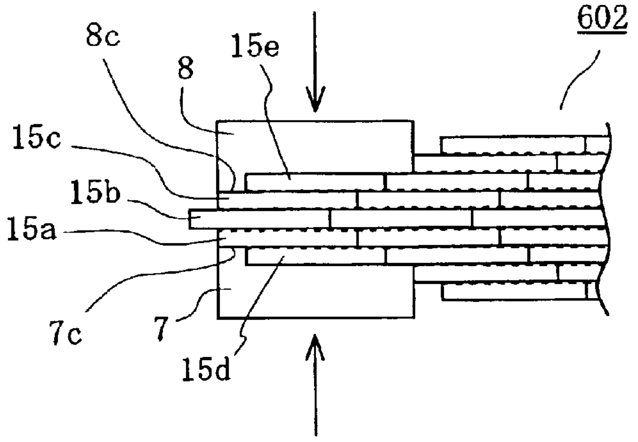

Then, the heat plates 7 and 8 are moved to their operative positions as shown in FIG. 42 to hot press under the same conditions for lamination of the veneer sheets 15*d* and 15*e* to the stack assembly 601. Thus, a laminated veneer stack assembly 602 is made.

Because the lower and upper surfaces of the veneer sheets 15*a* and 15*c* and their adjacent surfaces of veneer sheet in the same layers of the stack assembly 601 have been already heated to a high temperature by the hot pressing of FIG. 37, the adhesive on the veneer sheet 15*d* and 15*e* receive heat not only from the heat plates 7 and 8, but also from the previously heated surfaces of veneer sheets, so that curing of the adhesive can occur faster than when heated under the influence of only the heat from the heat plates 7 and 8.

During the hot pressing of FIG. 42, major part of the surface of the veneer sheet 15*a* is pressed by way of the veneer sheets 15*d* and the remaining surface thereof is pressed directly by the surface 7*c* of the heat plate 7. Similarly, major part of the surface of the veneer sheet 15*c* is pressed by way of the veneer sheets 15*e* and the remaining surface thereof is pressed directly by the surface 8*c* of the heat plate 7. Thus, the progress of curing of adhesive coated on the veneer sheets 15*a* and 15*c* occurs during the hot pressing of FIG. 42, with the result that the desired boding of veneer sheets 15*a* and 15*c* to the intermediate veneer sheet 15*b* and to part of veneer sheet in the original stack assembly 6 can be accomplished successfully.

As indicated earlier with reference to FIG. 37, the outer exposed surfaces of veneer sheets in the third and seventh layers of the veneer stack assembly 601 are kept in direct contact with the heat plates 7 and 8, and hence these surfaces are heated to a high temperature during this one-minute hot pressing FIG. 42.

After one minute of hot pressing, the heat plates 7 and 8 are retracted to their inoperative positions, and the veneer stack assembly 602 is shifted leftwards for a predetermined distance (not shown), a pair of veneer sheets 15*f* and 15*g* is added for lamination in the same manner as described, thereby forming a laminated veneer stack assembly 603 (not shown). Further, lamination of still another pair of veneer sheets 15*h* and 15*i* is perform in the same manner, thus a laminated veneer stack assembly 604 being formed, as shown in FIG. 43.

Figure 43:
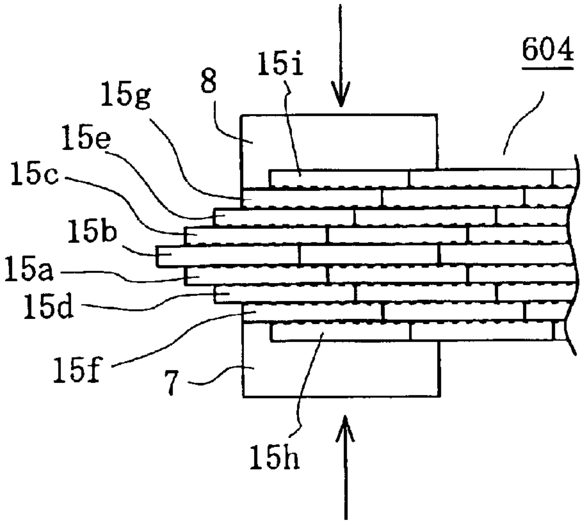

It is noted that since the outermost veneer sheets 15*h* and 15*i* are hot pressed by only one stroke of hot pressing operation and, for the adhesives on these veneer sheets to be cured sufficiently, the hot pressing in FIG. 43 to make the stack assembly 604 should be continued longer than one minutes, e.g. for three minutes.

Figure 44:
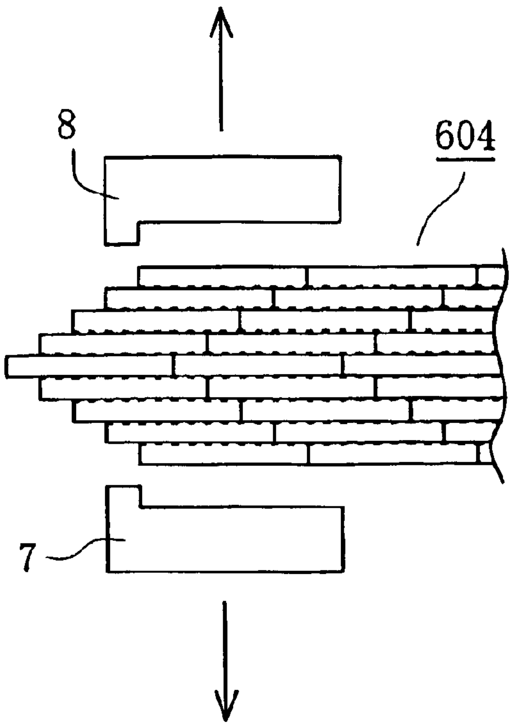
Figure 45:
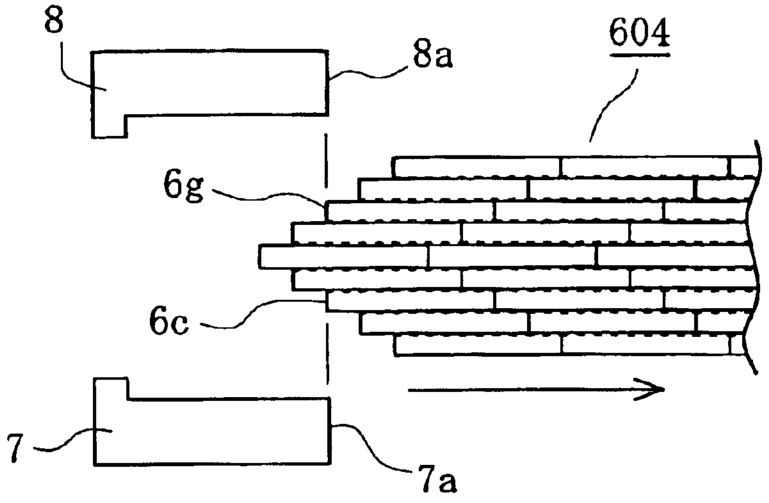

After three minutes have passed, the heat plates 7 and 8 are retracted as shown in FIG. 44. Subsequently, the conveyer E (not shown) is operated to shift the stack assembly 604 in arrow direction to a position where the exposed end face 6*c* of veneer sheet in the third layer in the veneer stack assembly 604 and the exposed end face 6*g* of veneer sheet in the seventh layer in the assembly 604 come in vertical alignment with the end faces 7*a* and 8*a* of the lower and upper heat plate 7 and 8, respectively, as shown in FIG. 45. The end portion of the veneer stack assembly 604 serves as the end of a new base material for further lamination of veneer sheets.

A series of steps of operation as described with reference to FIGS. 33 through 45 is repeated as many times as required to produce the desired length of nine-layered LVL board.

As is apparent from the foregoing description, this fourth embodiment is advantageous over its preceding embodiments in that part of surface of a veneer stack assembly corresponding to the areas S indicated in FIG. 29, as well as the entire surfaces of paired veneer sheets adjacent to the areas S can be heated by hot pressing so that next veneer sheets to be laminated can be heated additionally by the heat conducted from the previously laminated veneer sheets. Thus, hot pressing time can be advantageously shortened.

The following will describe various modified embodiments according to the present invention.

Figure 46:
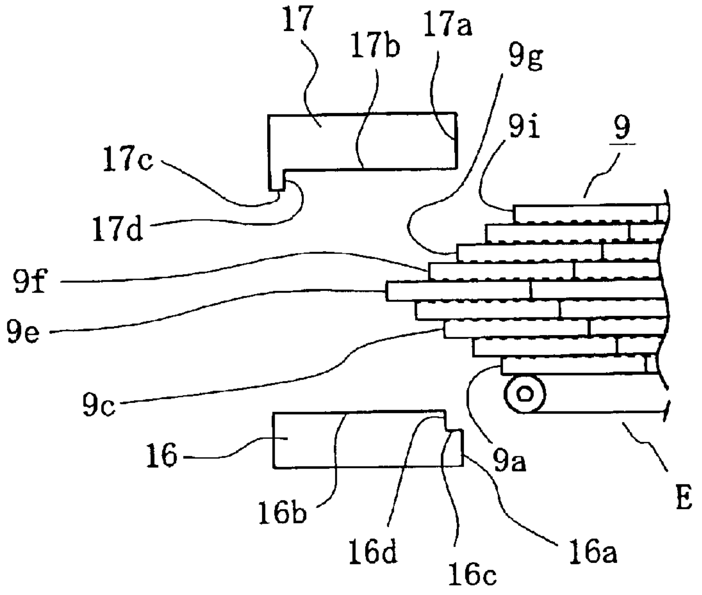
FIGS. 46 through 48 are schematic illustrative views showing a modified embodiment according to the present invention.

A modified embodiment will be explained with reference to FIGS. 46 through 48. Referring to FIG. 46, there is shown an initial veneer stack assembly 9 of a nine-layer configuration. Though the stack assembly 9 is similar to that of the assembly 2 shown in FIG. 5, it differs therefrom in respect of the staggered arrangement of component veneer sheets. That is, the offset distance between any two adjacent exposed end faces of veneer sheets in the first to fifth layers and in the sixth ninth layers of the veneer stack assembly 9 is about 100 mm, but the offset distance between exposed end faces 9*e* and 9*f* of veneer sheets in the fifth and sixth layers is about 150 mm. By so arranging the component veneer sheets in the stack assembly 9, alignment of end joints in a finished LVL board in the direction of its thickness can be prevented, so that the concentration of stress in the LVL board when it is subjected to bending can be avoided, with the result that the product strength is increased.

The apparatus for practicing this method has a lower heat plate 16 and an upper heat plate 17. The lower heat plate 16 has an upper surface 16*b* with a lengthwise dimension of about 1,100 mm, a recessed surface 16*c* with a lengthwise dimension of about 50 mm and a vertical stepped surface 16*d* with a height of about 4 mm corresponding to the veneer sheet thickness. On the other hand, the upper heat plate 17 has a lower surface 17*b* with a lengthwise dimension of about 1,100 mm, a projected surface 17*c* with a lengthwise dimension of about 50 mm and a vertical stepped surface 17*d* of about 4 mm. These heat plates 16 and 17 are disposed one above the other with the right end faces 16*a* and 17*a* in vertical alignment with each other and heated to the same temperature in the same manner as in the preceding embodiments.

FIG. 46 shows the initial state of the apparatus for performing the method, wherein both heat plates 16 and 17 are placed in their retracted positions, respectively, and the veneer stack assembly 9 carried on the conveyer E is placed at a position where the exposed end face 9*g* of veneer sheet in the seventh layer are in vertical alignment with the respective end faces 17*a* and 16*a* of the lower heat plates 16 and 17.

Figure 47:
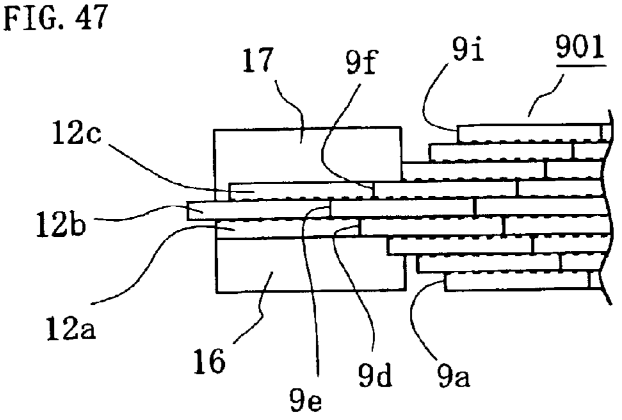

Though detailed description is omitted, three veneer sheets 12*a*, 12*b* and 12*c* are stacked and hot pressed by the heat plates 16 and 17 thereby to form a laminated veneer stack assembly 901, as shown in FIG. 47. Stacking arrangement of these veneer sheets 12*a*, 12*b* and 12*c* just before the hot pressing may be performed by using steps of procedure similar to those which have been described with reference to FIGS. 33 to 36 for the fourth embodiment. In the veneer stack assembly 901, the veneer sheets 12*a*, 12*b* and 12*c* are laminated to the previous veneer stack assembly 9 with their right end faces in abutment with the exposed end faces 9*d*, 9*e* and 9*f* of veneer sheets in the fifth, sixth and seventh layers of the assembly 9.

In this hot pressing, the respective entire inner adhesive-coated surfaces of veneer sheets 12*a* and 12*c* are hot pressed against the opposite surfaces of the intermediate veneer sheet 12*b* and of the projecting portion of the veneer sheet in the fifth layer of the stack assembly 9. Simultaneously, the respective entire outer surfaces of veneer sheets 12*a* and 12*c*, as well as the lower exposed surface of veneer sheet in the fourth layer and the upper exposed surface of veneer sheet in the sixth layer of the veneer stack assembly 9, are kept in pressing contact with the heat plates 16 and 17.

Figure 48:
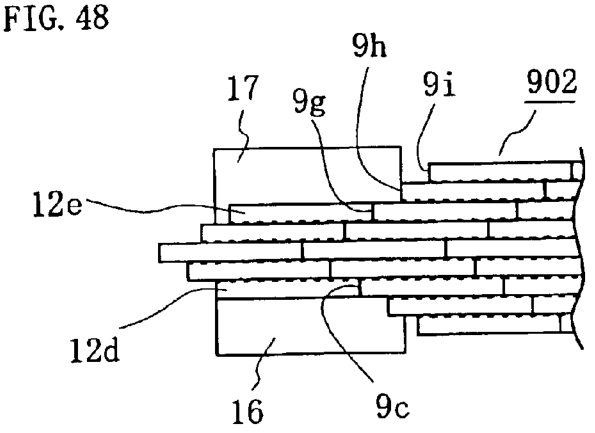

FIG. 48 shows a state in which the veneer stack assembly 901 has been already shifted leftwards to a position where the exposed end face 9*h* of veneer sheet in the eighth layer of the stack assembly 901 is in vertical alignment with the end faces 16*a* and 17*a* the heat plates 16 and 17, and fourth and fifth veneer sheets 12*d* and 12*e* are being hot pressed for lamination thereof to the veneer stack assembly 901. During the hot pressing, adhesive-coated surfaces on the veneer sheets 12*d* and 12*e* receive heat not only from the heat plates 16 and 17, but also from the previously hot pressed surfaces of veneer sheets. The resulting laminated veneer stack assembly is designated by numeral 902.

Pairs of sixth and seventh veneer sheets (not shown) for the second and eighth layers and of eighth and ninth veneer sheets (not shown) for the first and ninth layers are added for laminated in the same manner as described above thereby to make a nine-layered veneer stack assembly (not shown).

A series of steps of operation as described above is repeated as many times as required to produce the desired length of LVL board of nine-layer configuration.

A modification to the second embodiment will be described in the following while having reference to FIGS. 49 through 53.

Figure 49:
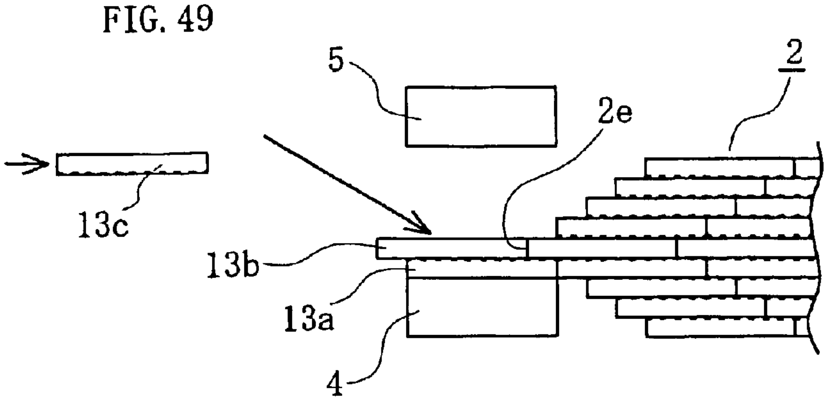
FIGS. 49 through 53 are schematic illustrative views showing a modification to the second embodiment.
Figure 50:
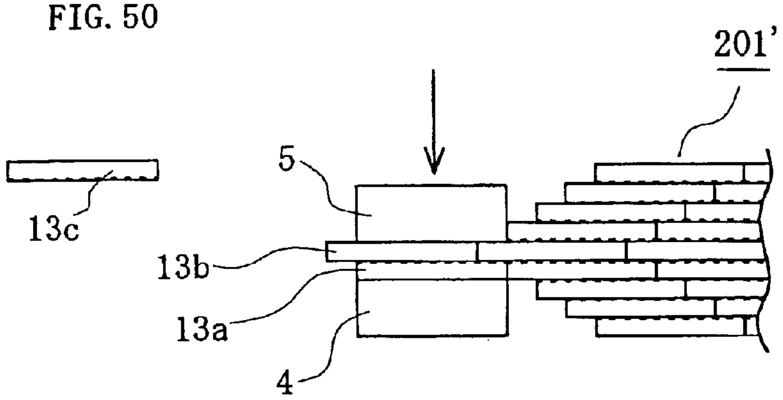
Figure 51:
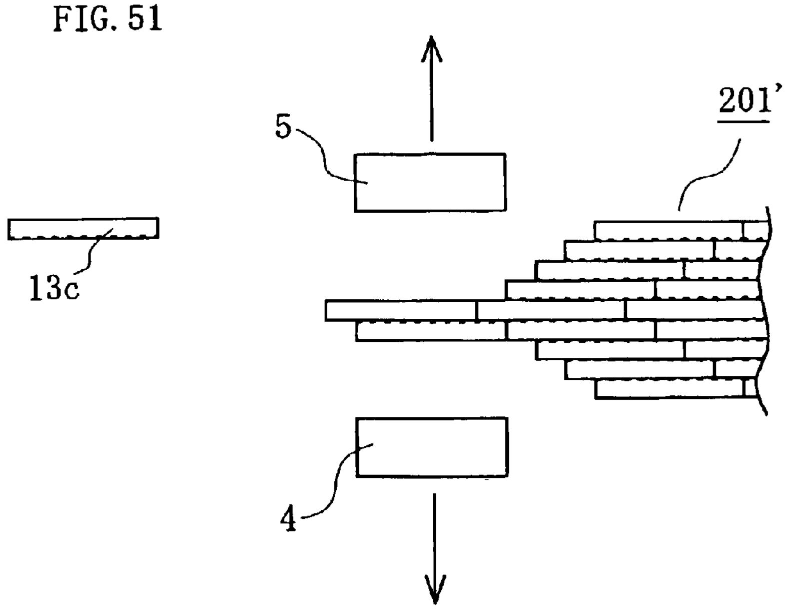
Figure 52:
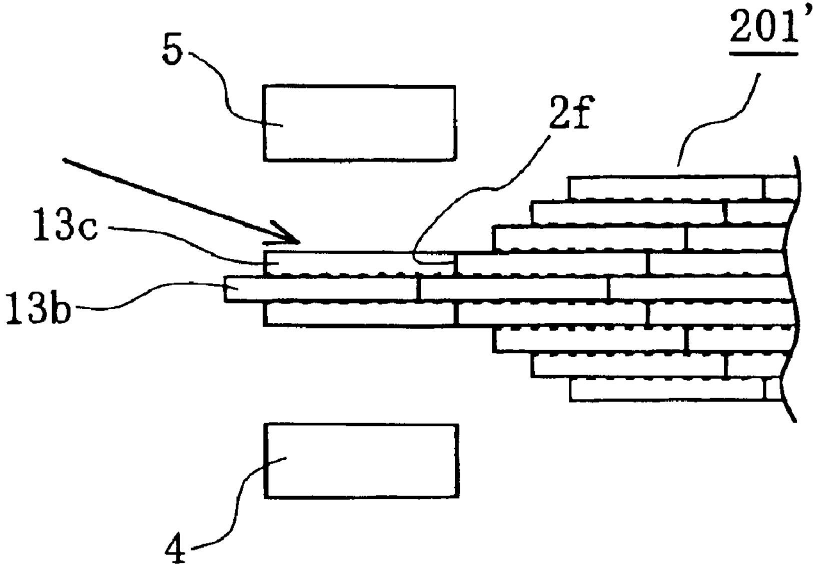
Figure 53:
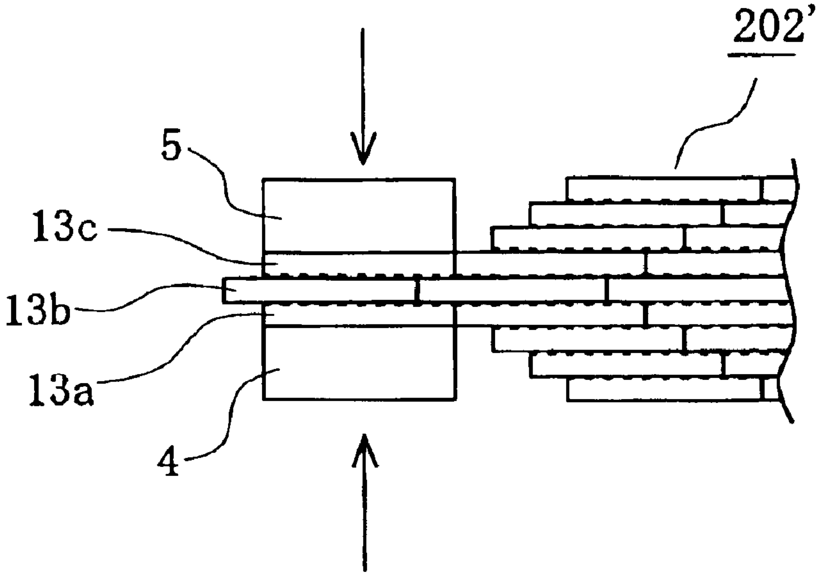

In the second embodiment shown in FIGS. 5 through 18, the first three veneer sheets 13*a*, 13*b* and 13*c* are laid up to be hot pressed simultaneously by the heat plates 4 and 5. The modification differs from the second embodiment in that the veneer sheets 13*a* is laid on the lower heat plate 3 and the veneer sheet 13*b* on the sheet 13*a*, as shown in FIG. 49, and these two veneer sheets are hot pressed, as shown in FIG. 50, whereby a laminated veneer stack assembly 201' is formed. After the heat plates 4 and 5 are retracted as shown in FIG. 51, the third veneer sheet 13*c* is laid on and across the upper surface of veneer sheet 13*b* and the exposed upper surface of veneer sheet in the fifth layer of the veneer stack assembly 201', as shown in FIG. 52. After the third veneer sheet 13*c* has been thus laid, the heat plates 4 and 5 are activated to hot press the three veneer sheets 13*a*, 13*b* and 13*c*, as shown in FIG. 53, thus a laminated veneer stack assembly 202' is made.

Referring now to FIGS. 54 through 63, a modification to the third embodiment of FIGS. 19 through 31 will be described. The modification differs from the third embodiment in that a plurality of veneer sheets, or two sheet in the illustrated modification, are added successively for each layer.

Figure 54:
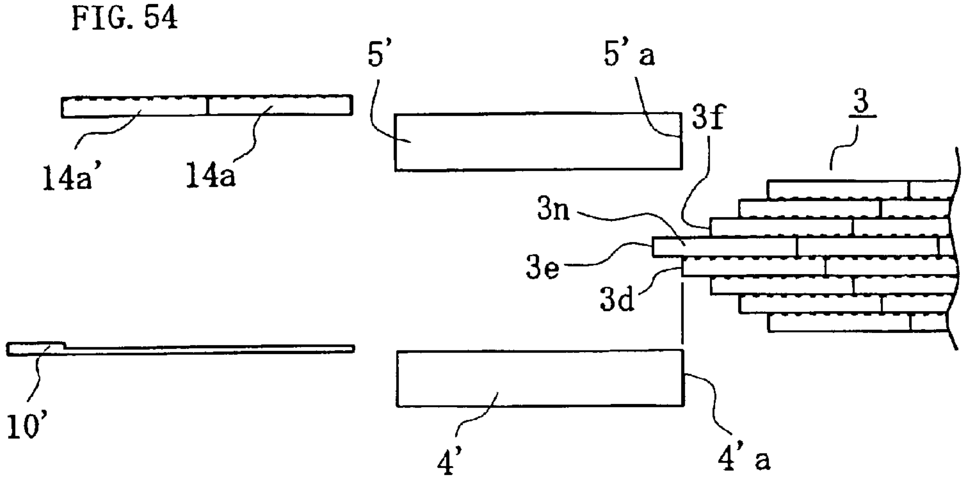
FIGS. 54 through 63 are schematic illustrative views showing a modification to the third embodiment.

In FIG. 54, lower and upper heat plates 4' and 5' have a lengthwise dimension which substantially corresponds to twice the veneer sheet length, i.e. about 2,000 mm. Veneer carrier 10' is shaped similar to the counterpart 10 shown in FIG. 19, but its veneer sheet receiving surface has substantially the same length as the heat plates 4' and 5'. In the initial state of the apparatus for performing the method of this embodiment, the hot plates 4', 5' and the veneer carrier 10' are placed in their retracted positions, and the veneer stack assembly 3 is located by the conveyer E (not shown) at a position where the exposed end face 3*d* of veneer sheet in the fourth layer is in vertical alignment with the end faces 4'*a* and 5'a of the heat plates 4' and 5'. Two veneer sheets 14a, 14a' with the upper surfaces thereof coated with a thermosetting adhesive and disposed in tandem relation are prepared, as shown in FIG. 54.

Figure 55:
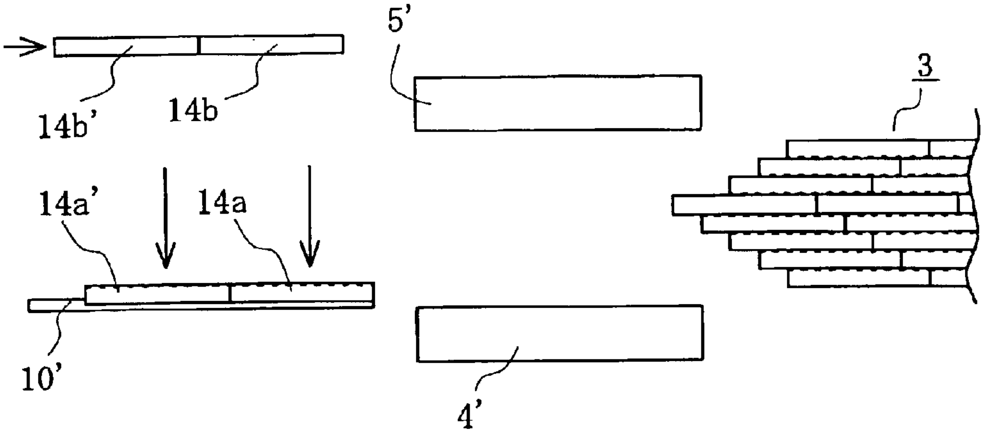
Figure 56:
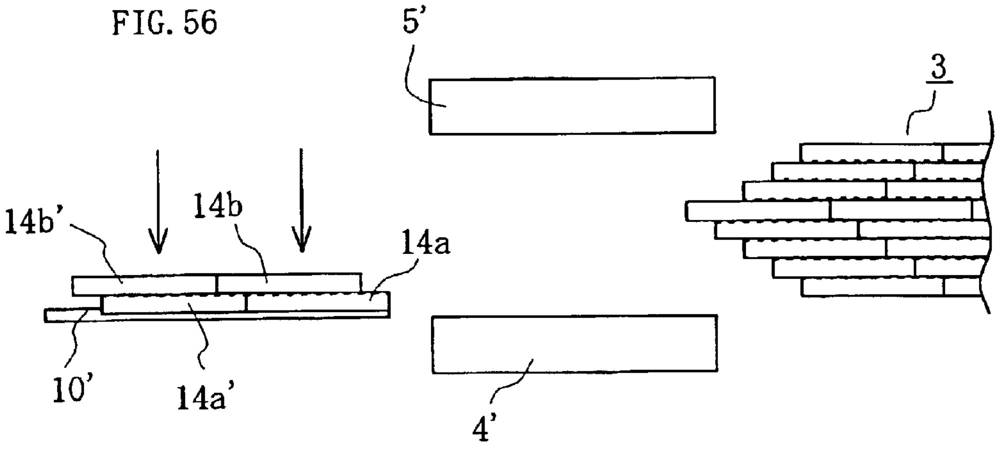

The veneer sheets 14a, 14a' are fed as indicated by arrow onto the receiving surface of the carrier 10' with the left end of the veneer sheet 14a' in abutment with the stepped portion of the carrier 10' and, simultaneously, a second set of two veneer sheets 14b and 14b' having no adhesive coating is prepared, as shown in FIG. 55. Then, the second set of veneer sheets 14b, 14b' is fed and laid onto the adhesive-coated upper surfaces of the veneer sheets 14a, 14a' in a staggered relation with an offset distance of about 100 mm, as shown in FIG. 56.

Figure 57:
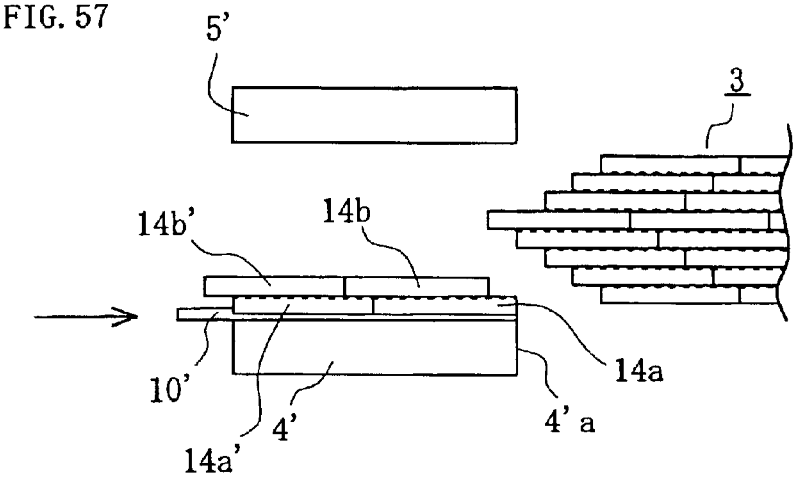

Then, the carrier 10' is moved as indicated by arrow onto the top surface of the lower heat plate 4' with the right end face of the carrier 10' and hence the right end face of the veneer sheet 14a positioned in vertical alignment with the right end face 4'a of the heat plate 4', as shown in FIG. 57.

Figure 58:
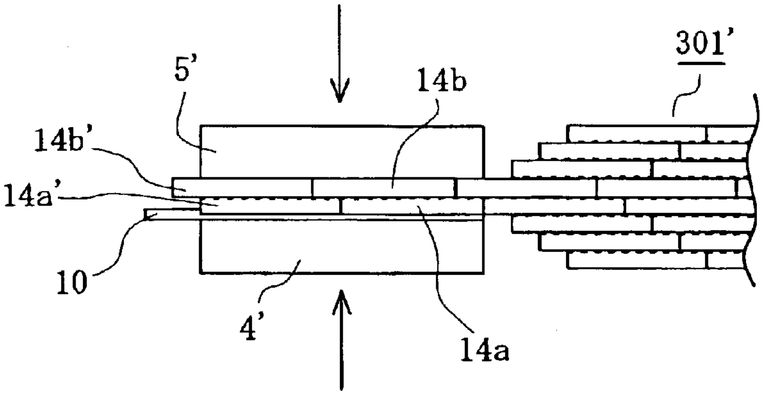

After the carrier 10' has been thus positioned on the heat plate 4', the lower and upper heat plates 4' and 5' are moved toward each other to hot press the veneer sheets 14a, 14a' and 14b, 14b' for lamination to the initial veneer stack assembly 3. Hot pressing is continued for about three minutes under a pressure of about 1 MPa. As a result, the veneer sheets are bonded to the veneer stack assembly 3, thus a laminated veneer stack assembly 301' being formed, as shown in FIG. 58.

Figure 59:
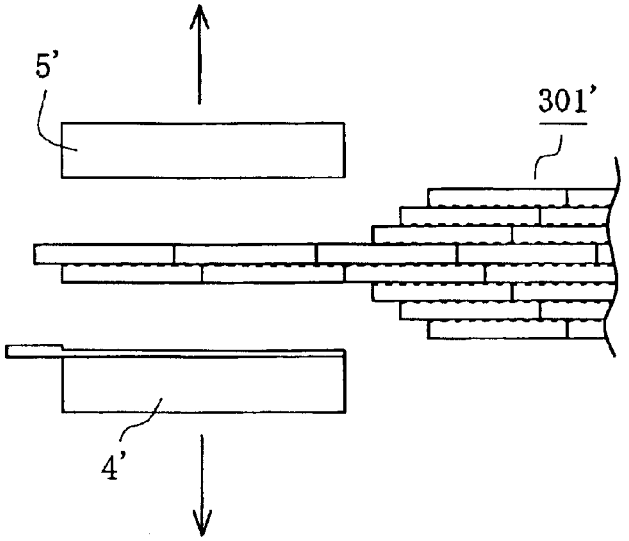
Figure 60:
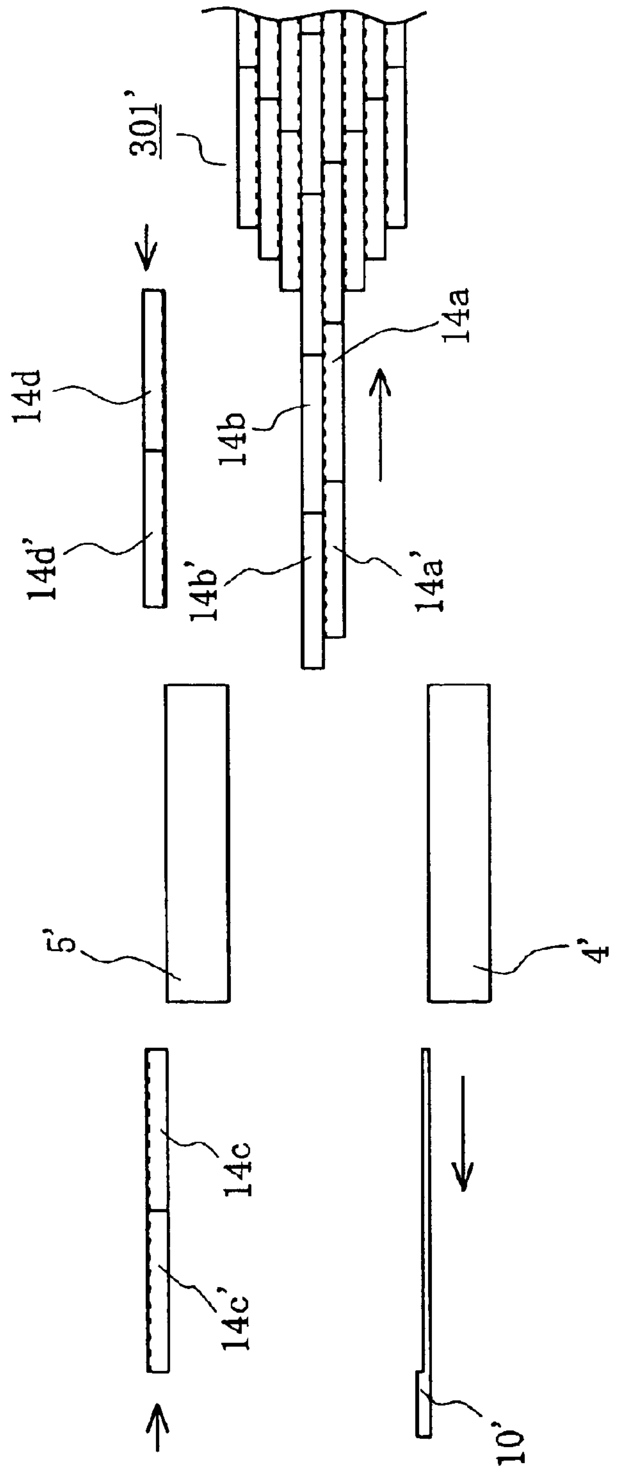

After the hot pressing is over, the heat plates 4' and 5' are moved to their retracted positions, as shown in FIG. 59, and subsequently the carrier 10' is moved back to its original position and the veneer stack assembly 301' is moved rightwards by the conveyer E (not shown), as shown in FIG. 60. Third and fourth sets of veneer sheets 14c, 14c' and 14d, 14d' having their respective upper and lower surfaces coated with adhesive are prepared.

Figure 61:
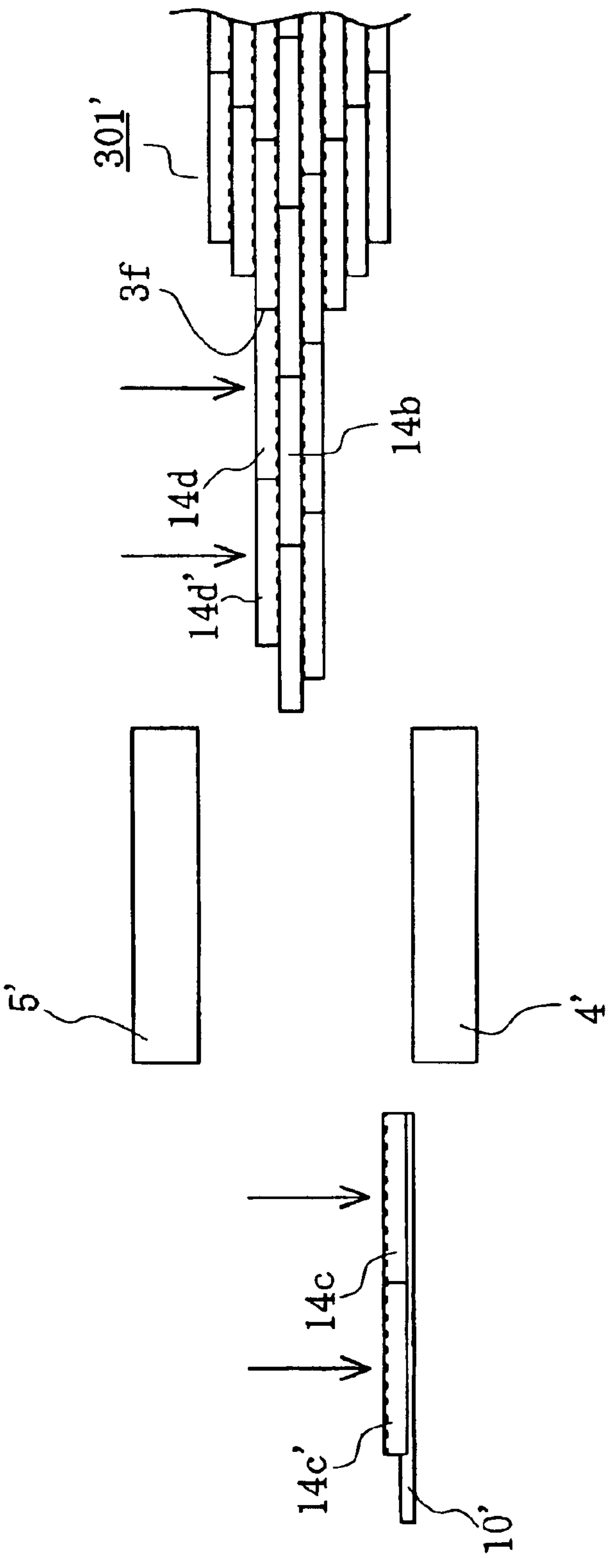
Figure 62:
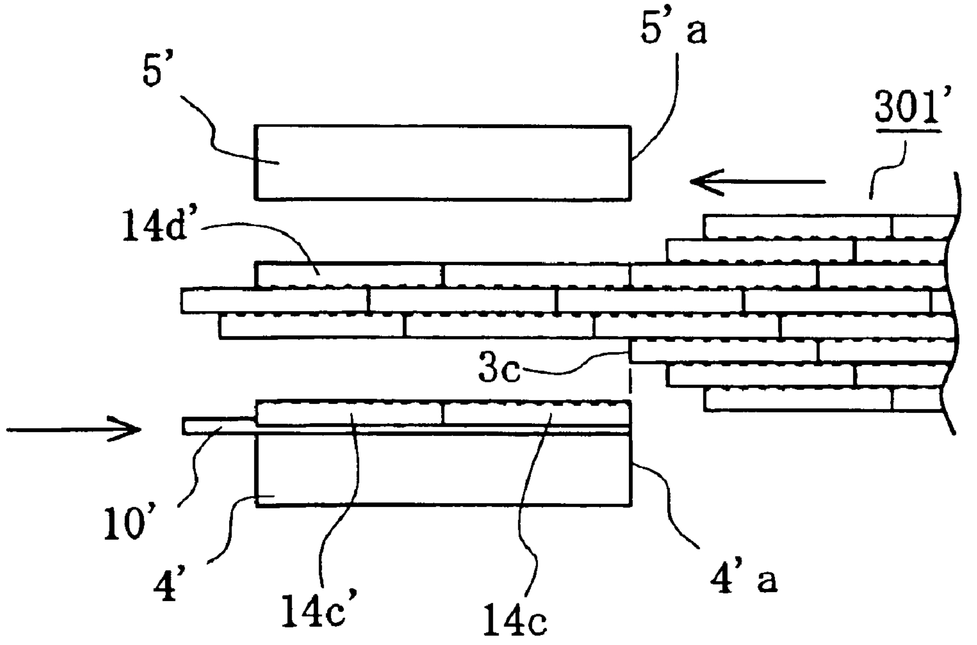
Figure 63:
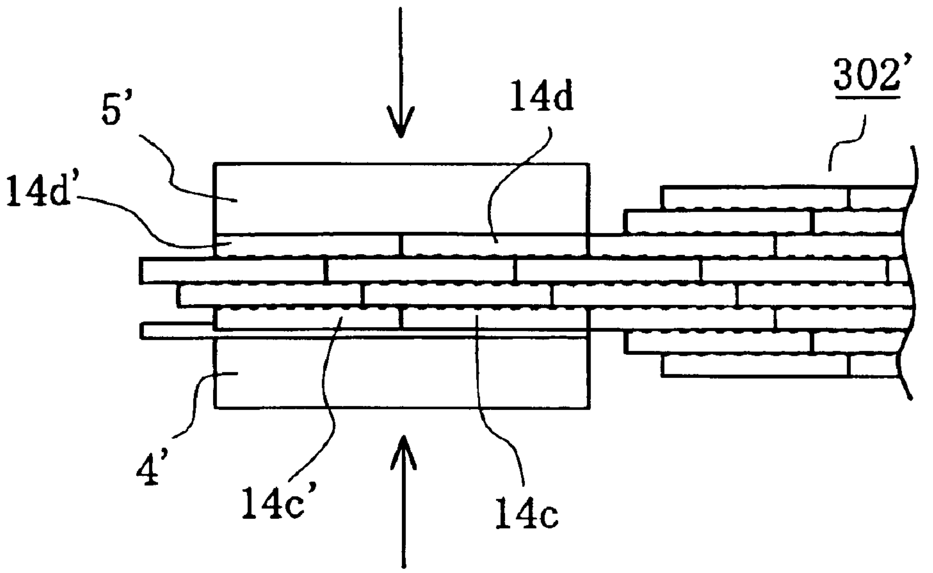

The veneer sheets 14c and 14c' are placed onto the carrier 10', while the veneer sheets 14d and 14d' are laid onto the stack assembly 301' with the right end face of the veneer sheet 14d in abutment with the exposed end face 3f of veneer sheet in the sixth layer of the stack assembly 301', as shown in FIG. 61. Then, the veneer stack assembly 301' is moved by the conveyer E (not shown) to a position where the end face 3c of veneer sheet in the third layer is in vertical alignment with the end face 4'a of the lower heat plate 4', and the carrier 10' is moved onto the upper surface of the heat plate 4', as shown in FIG. 62. Then, the heat plates 4 and 5 are activated to move toward each other to hot press the two sets of veneer sheets 14c, 14c' and 14d, 14d' to bond them to the stack assembly 301', as shown in FIG. 63, whereby a laminated veneer stack assembly 302' is formed.

A series of steps of operation similar to those which are described with reference to FIGS. 55 through 63 is repeated as many times as required to produce the desired length of LVL board.

This embodiment is advantageous in terms of laminating efficiency because two veneer sheets can be added for lamination to each layer of a stack assembly or a base material by one stroke of hot pressing operation.

Now referring to FIGS. 64 through 68, the following will describe a modification to the first preferred embodiment. Unlike the first preferred embodiment wherein a single veneer sheet such as 11b, 11c, etc. is laid for each hot pressing operation, according to the modification thereto, a plurality of veneer sheets is laid up one on another for one stroke of hot pressing operation.

Figure 64:
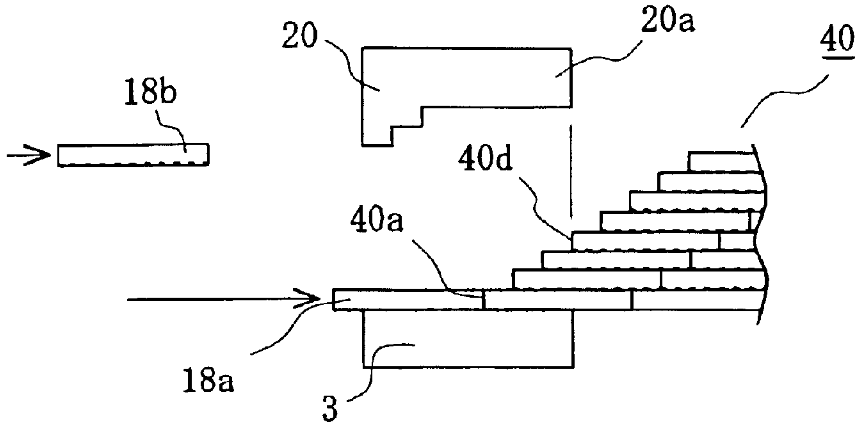
FIGS. 64 through 68 are schematic illustrative views showing a modification to the first embodiment.
Figure 65:
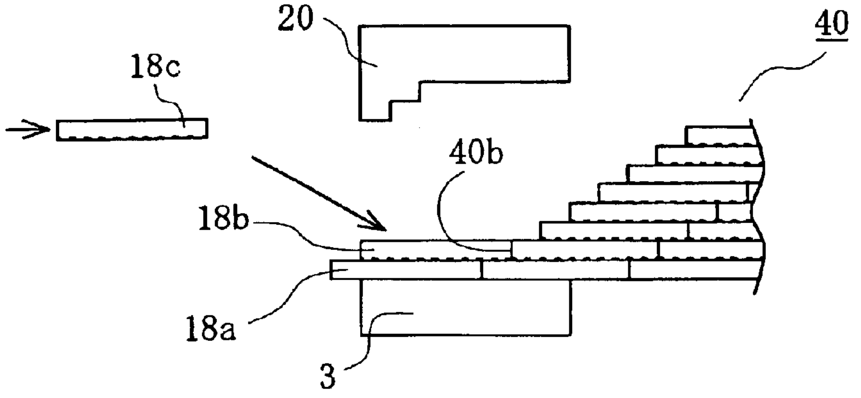
Figure 66:
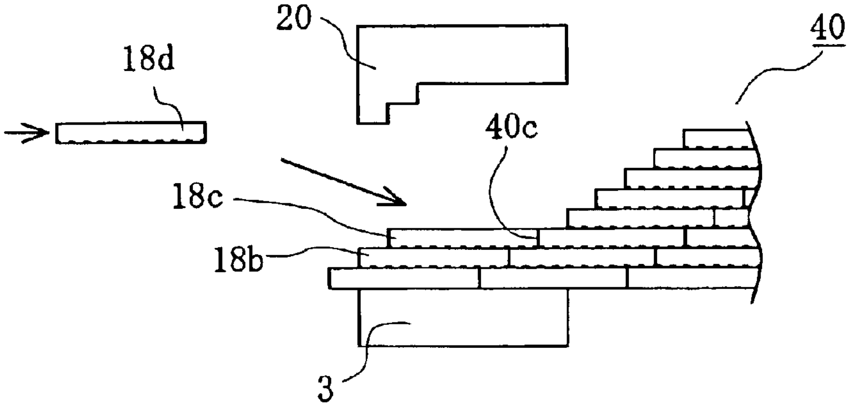
Figure 67:
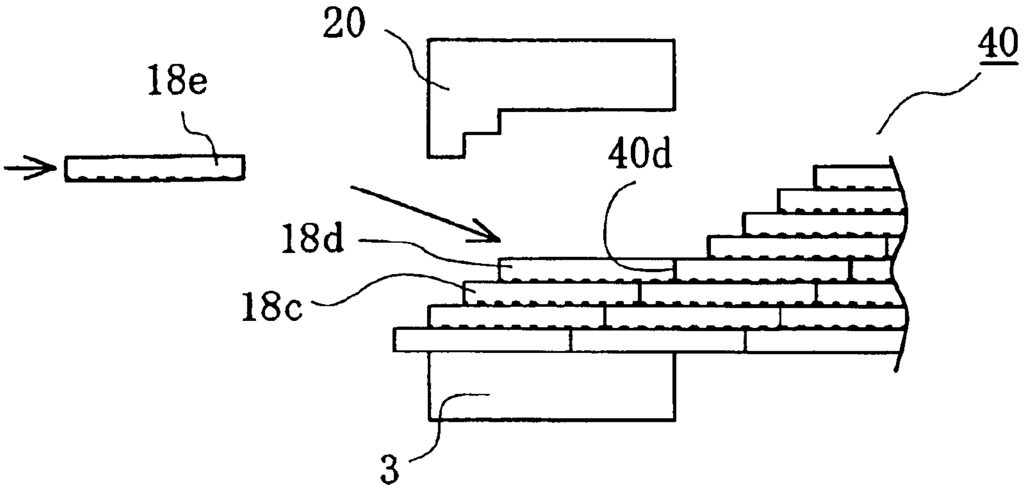
Figure 68:
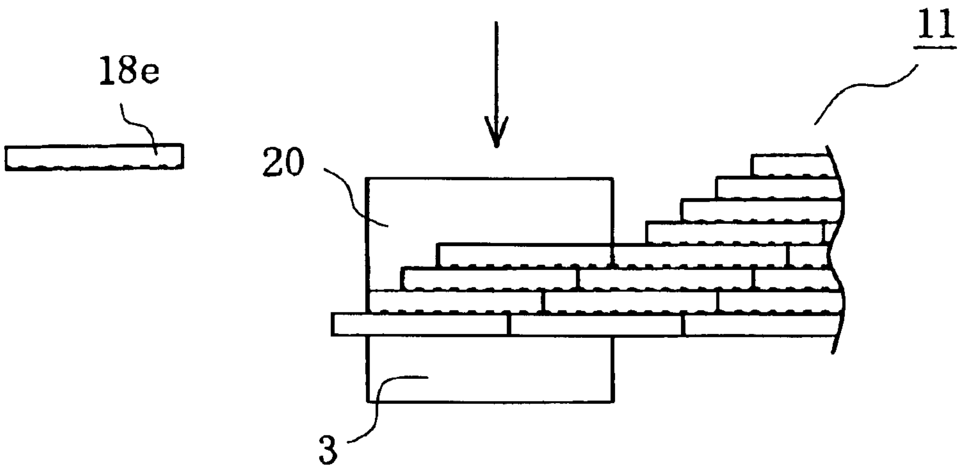

Referring to FIG. 64, a first veneer sheet 18a is placed on the lower heat plate 3 with the right end face thereof in abutment with the end face 40a of veneer sheet in the first layer of an initial veneer stack assembly 40. Then, a second veneer sheet 18b is laid in abutment with the end face 40b of veneer sheet in the second layer of the veneer stack assembly 40, as shown in FIG. 65, which is followed by addition of third and fourth veneer sheets 18c and 18d with the right end faces thereof in abutment with the exposed end faces 40c and 40d of veneer sheets in the third and fourth layers, as shown in FIGS. 66 and 67, respectively. After these four veneer sheets have been laid up, a movable upper heat plate 20 is lowered to hot press the veneer sheets simultaneously for lamination to the stack assembly 40, as shown in FIG. 68. For this purpose, the upper movable heat plate 20 is shaped so as to conform with the staggered form of the laid up veneer sheets. Hot pressing is done under a pressure of about 1 MPa for about three minutes, whereby a laminated veneer stack assembly 11 is formed. For veneer sheets for the remaining fifth to eighth layers, one veneer sheet may be added for each stroke of hot pressing operation.

While the invention has been described and illustrated with reference to the specific embodiments, it is to be understood that the invention can be practiced in other various changes and modifications without departing from the spirit or scope of the invention, as exemplified below.

Figure 69:
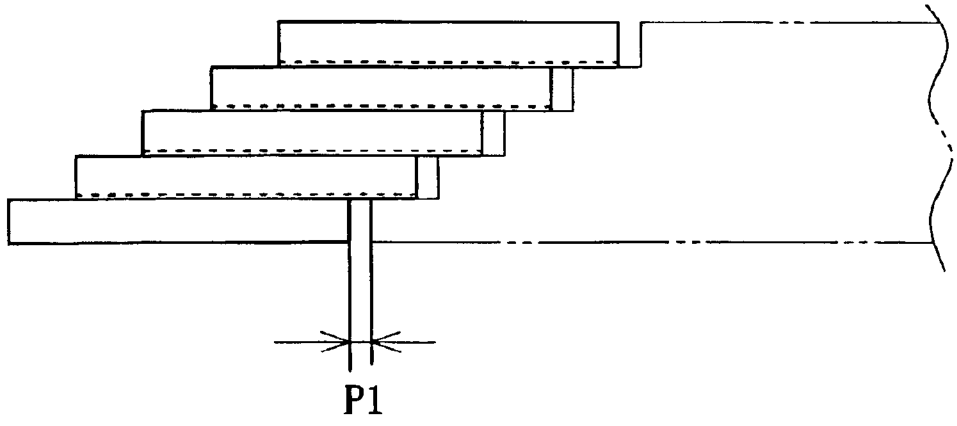
FIG. 69 is a schematic illustrative view showing a modified embodiment of the invention.

In the foregoing embodiments, each veneer sheet is disposed with the end faces thereof in abutment with similar end faces of its adjacent veneer sheet in the same layer of a veneer stack assembly. The scope of the invention is not limited to such an arrangement of veneer sheets, but they may be laid up with a space P1 as shown in FIG. 69 between any two adjacent veneer sheets in each layer of a stack assembly or a finished product. Though depending on various conditions, the space P1 may be provided in the range from about 3 mm to 10 mm. As is well known to those skilled in the art, the adhesive used for wood lamination contains formaldehyde which is harmful to human body. The provision of such spaces P1 in the glued laminated wood helps to allow the formaldehyde contained in the adhesive to be released therefrom faster into the atmosphere than the laminated wood with no such space P1. Glued laminated wood or LVL board having formed therein such spaces may be used advantageously as construction or structural members for interior use.

In the above-described embodiments, veneer sheets with a thickness of about 4 mm are laminated with the end joints disposed in a staggered array with an offset distance of about 100 mm. The offset distance should be as practically long as possible so as to disperse the end joints in any two adjacent layers by an increased distance thereby to increase the strength of the resulting board against bending. In view of the required strength of the glued laminated wood or LVL board, the lower permissible range of offset distance should be from 5 to 20 times the thickness of veneer sheet.

Figure 70:
FIGS. 70 and 71 are schematic illustrative views showing another modified embodiment of the invention.
Figure 71:
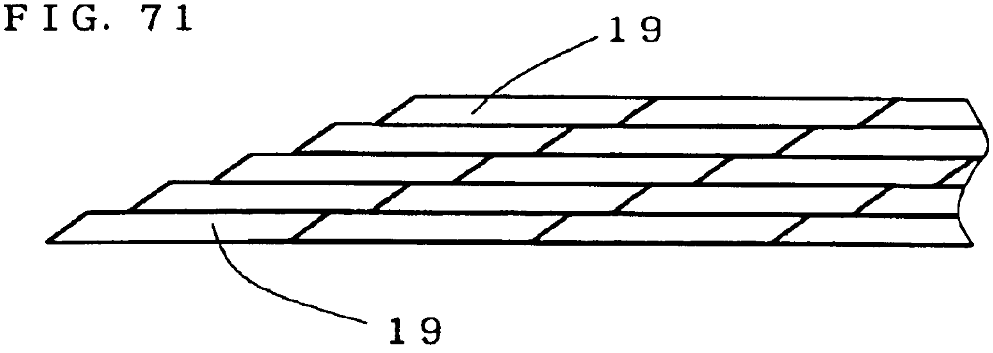

It is to be noted that the method of the invention is not limited to the use of a veneer sheet whose opposite ends are cut square with respect to the top and bottom surfaces of the veneer sheet. Now referring to FIG. 70 showing a single sheet of veneer 19, it has its both ends beveled or scarf-cut at an angle with respect to its top and bottom surfaces in the same direction. FIG. 71 shows a part of LVL board made using a number of veneer sheets 19 which are laminated together in an arrangement similar to that of the first preferred embodiment. As shown in FIG. 71, the ends of the respective veneer sheets 19 are lap jointed, that is one beveled end face of a veneer sheet is placed over a beveled end face of another veneer sheet in an overlapping relation.

Figure 72:
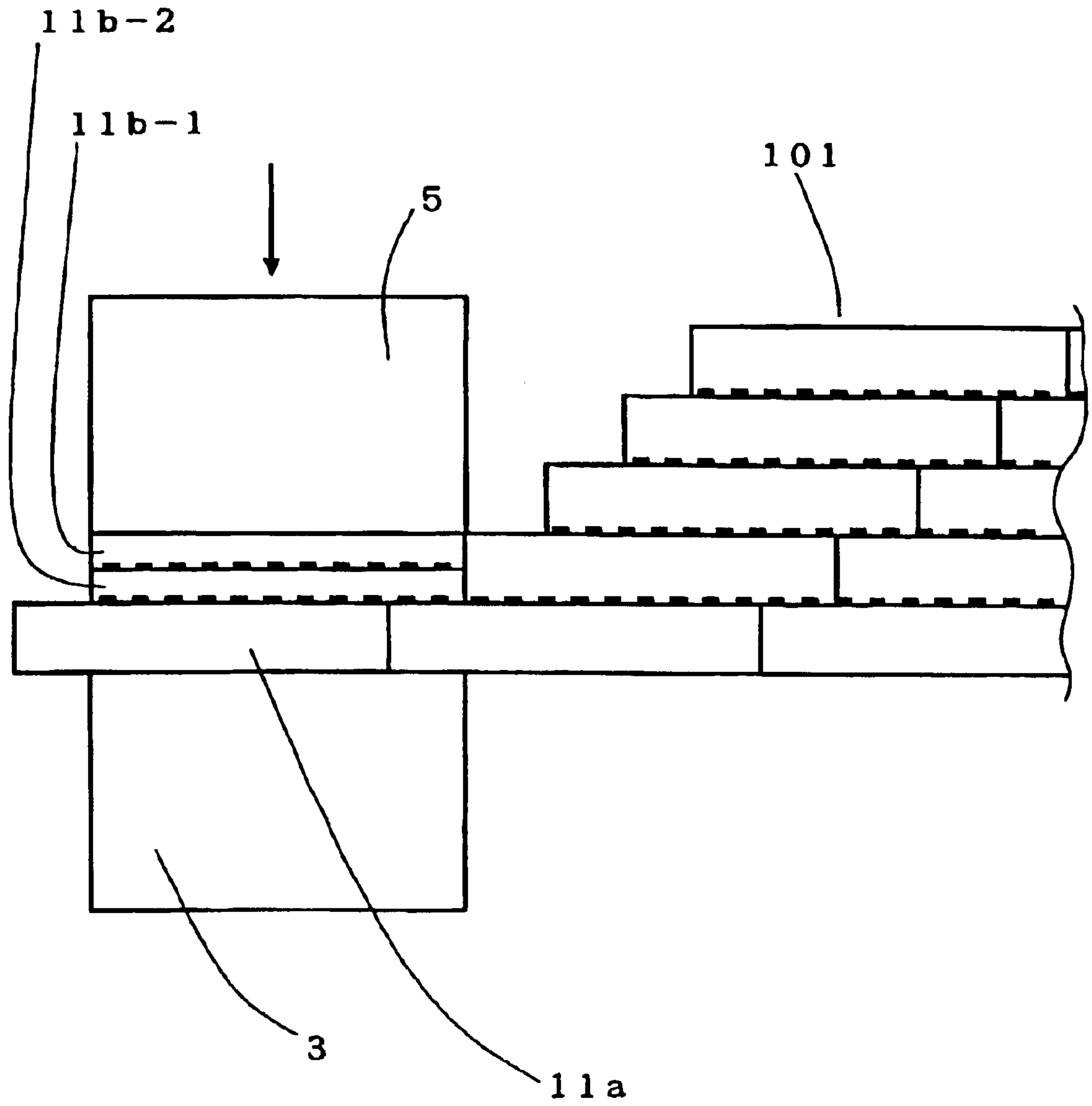
FIG. 72 is a schematic illustrative view showing still another modified embodiment of the invention.

As indicated in FIG. 72 showing still another modified embodiment of the present invention, a layer of veneer sheet for lamination may be substituted by a plurality of veneer sheets. For example, a single sheet of veneer 11*b* in FIG. 2A may be substituted by two sheets of veneer 11*b*-1 and 11*b*-2 each having a thickness of about 2 mm and glued together by a thermosetting adhesive, as shown in FIG. 70, so that the resulting combined thickness becomes about 4 mm.

Furthermore, at least one of the component veneer sheets for the glued laminated wood may be replaced by a wood material produced by a process other than peeling or slicing, e.g. by sawing, and having substantially the same thickness as the component veneer sheet.

Still furthermore, the invention does not necessarily limit the glued laminated wood to a structure in which wood material such as veneer sheets are disposed in the glued laminated wood with the wood grain of each veneer sheet extending primarily along the length of the product, but at least one wood sheet may be disposed with the wood grain thereof oriented in perpendicular relation to the length the product.

What is claimed is:

1. A method of manufacturing glued laminated wood which is made of a number of wood sheets, each having a predetermined length, width and thickness, and having a first surface and a second surface, laminated together by hot pressing with a thermosetting adhesive into a continuous length of multiple-layered board of said glued laminated wood,comprising the steps of:

providing an initial base material having an end from which said continuous length of the glued laminated wood board is formed extending in its lengthwise direction, said end of the initial base material being shaped in the form of a flight of steps including a series of alternate horizontal surfaces each having a lengthwise dimension smaller than the length of each wood sheet and a series of crossing surfaces formed at an angle with respect to said respective horizontal surfaces, any two adjacent horizontal surfaces thereof across the thickness of the initial base material being spaced at an interval substantially the same as the thickness of the wood sheet;

feeding wood sheets to be used in said glued laminated wood board adjacent to said end of the initial base material with one end thereof being disposed in facing relation to the respective crossing surfaces so that the thus fed wood sheets are laminated in said glued laminated wood board with opposite ends thereof remote from the initial base material being disposed in a staggered array which is similar to said form of flight of steps; and hot pressing at least one of the thus fed wood sheets for lamination by a hot press having a pair of plates, at least one of which is heated, each having an effective pressing area capable of entirely covering either one of said first and second surfaces of any of said wood sheets, said at least one of said wood sheets being placed and maintained for a predetermined length of time at a position where the first surface of said at least one of said wood sheets is kept to be pressed in its entirety by one of said plates while the second surface of said at least one of said wood sheets is supported in its entirety by the other plate with a layer of thermosetting adhesive being interposed between surfaces of said wood sheets.

2. A method of manufacturing glued laminated wood according to claim 1, wherein said angle with respect to said horizontal surface is a right angle, said crossing surface has a height which is substantially the same as the thickness of each wood sheet, and said each wood sheet has its opposite ends cut at a right angle through the thickness thereof.

3. A method of manufacturing glued laminated wood according to claim 2, wherein each wood sheet in each layer of the glued laminated wood board is disposed with an end thereof in abutment with an end of the adjacent wood sheet in the same layer.

4. A method of manufacturing glued laminated wood according to claim 2, wherein wood sheets in each layer of the glued laminated wood board are disposed with a space of a predetermined amount formed between any two facing end faces of any two adjacent wood sheets in said each layer.

5. A method of manufacturing glued laminated wood according to claim 1, wherein each wood sheet has its opposite ends beveled at a predetermined angle in the same direction with respect to the opposite surfaces of the wood sheet and the wood sheets in each layer are disposed with the beveled ends thereof in overlapping relation to their adjacent similarly beveled ends of wood sheets in said each layer.

6. A method of manufacturing glued laminated wood according to claim 1, wherein said initial base material is made of a plurality of wood sheets which are assembled one on another in multiple layers and laminated together into the form of an assembly having one end thereof formed in said flight of steps.

7. A method of manufacturing glued laminated wood according to claim 1, wherein the wood sheets are laminated together with the wood grain thereof running primarily along the length of the glued laminated wood board.

8. A method of manufacturing glued laminated wood according to claim 1, wherein the wood sheets for lamination include sheets of veneer.

9. A method of manufacturing glued laminated wood according to claim 1, wherein at least one of the wood sheets is made of at least two sheets of wood whose total thickness substantially corresponds to said thickness of the wood sheet.

10. A method of manufacturing glued laminated wood according to claim 1, wherein said feeding step includes a step of moving a board of the glued laminated wood in progress to said position where the entire first surface of at least one wood sheet is kept in pressing contact with one of said plates while the entire second surface of said wood sheet is supported therebelow by the other plate.

11. A method of manufacturing glued laminated wood made of a number of wood sheets, each having a predetermined length, width and thickness, laminated together by hot pressing with a thermosetting adhesive into a continuous length of multiple-layered board of said glued laminated wood, comprising the steps of:

(a) providing a number of said wood sheets;

(b) providing an initial base material having an end from which a continuous length of said glued laminated wood board is to be formed extending therefrom, said end of the initial base material being shaped in the form of a flight of steps including a series of alternate first surfaces formed at an angle with respect to opposite top and bottom surfaces of said initial base material and a second surface formed substantially in parallel to said top and bottom surfaces, said second surface having a lengthwise dimension smaller than said length of the wood sheet and the spaced interval between any two adjacent said second surfaces as measured across the thickness of said initial base material being substantially the same as the thickness of the wood sheet, and either one of the uppermost and lowermost first surfaces of said series of alternate first and second surfaces defining the outermost surface of said end of the initial base material;

(c) providing a hot press including a pair of plates disposed one above the other, at least one of which is heated, each of said paired plates having an effective pressing area capable of covering the entire surface of the wood sheet;

(d) laying with respect to said initial base material at least two wood sheets one on another in such an offset relation that one wood sheet of said at least two wood sheets is positioned with one end surface located in facing relation to said outermost first surface of said initial base material and another wood sheet of said at least two wood sheets is positioned with one end surface thereof located in facing relation to the first surface of the initial base material adjacent to said outermost first surface;

(e) activating said hot press for hot pressing said at least two wood sheets for lamination thereof with a layer of thermosetting adhesive interposed between surfaces of said at least two wood sheets and with the initial base material then placed and maintained with respect to said plates where the entire top surface of at least one wood sheet of said at least two wood sheets is kept to be pressed from the top by said at least one plate of the hot press while the entire bottom surface of the same at least two wood sheets is supported from the bottom by the other plate for a predetermined length of time;

(f) laying at least one wood sheet on the previously laminated wood sheets in an such an offset relation thereto that said at least one wood sheet is positioned with one end surface located in facing relation to the first surface of the initial base material adjacent to the first surfaces to which one ends of said previously laminated wood sheet are located in facing relation;

(g) activating said hot press for pressing said at least one wood sheet for lamination thereof to the previously laminated wood sheets with a layer of thermosetting adhesive interposed between one surface of said at least one wood sheet and its mating surface of the previously laminated wood sheets and with the initial base material then positioned and maintained with respect to said plates where the entire top surface of said at least one wood sheet is kept to be pressed from the top by said at least one plate of the hot press while the entire bottom surface of the same at least one wood sheet is supported from therebelow by the other plate for a predetermined length of time;

(h) repeating the step (f) and (g) until the total thickness of the laminated wood sheets reaches the thickness of said initial base material, whereby a glued laminated wood board in progress is formed which has an end portion which is similar to said end of the initial base material, said end portion of the glued laminated wood board in progress being regarded as a base material for the subsequent lamination; and (i) repeating the steps (d) through (h) as many time as required until the desired length of the glued laminated wood board is made.

12. A method of manufacturing glued laminated wood made of a number of wood sheets, each having a predetermined length, width and thickness, laminated together by hot pressing with a thermosetting adhesive into a continuous length of multiple-layered board of said glued laminated wood, comprising the steps of:

(a) providing a number of said wood sheets;

(b) providing an initial base material having an end from which a continuous length of said glued laminated wood board is to be formed extending therefrom, said end of the initial base material being shaped in the form of flights of steps including a series of alternate first surface formed at an angle with respect to opposite top and bottom surfaces of said initial base material and a second surface formed substantially in parallel to said top and bottom surfaces, said second surface having a lengthwise dimension smaller than said length of the wood sheet and a spaced interval between any two adjacent said second surfaces as measured across the thickness of said initial base material being substantially the same as the thickness of the wood sheet, one intermediate first surface of said series of alternate first and second surfaces being disposed so as to define the outermost surface of said end of the initial base material, the second surfaces formed above said intermediate first surface facing upwards while the second surfaces formed below said intermediate first surface facing downward;

(c) providing a hot press including a pair of heat plates disposed one above the other, each of said paired plates having an effective pressing area capable of covering the entire surface of the wood sheet;

(d) laying with respect to said initial base material at least two wood sheets one on another in such an offset relation that one wood sheet of said at least two wood sheets is positioned with one end surface located in facing relation to said intermediate first surface of said initial base material and another wood sheet of said at least two wood sheets is positioned with one end surface thereof located in facing relation to the first surface of the initial base material adjacent to said intermediate first surface;

(e) activating said hot press for hot pressing said at least two wood sheets for lamination thereof with a layer of thermosetting adhesive interposed between surfaces of said at least two wood sheets and with the initial base material then placed and maintained with respect to said plates where the entire top surface of at least one wood sheet of said at least two wood sheets is kept to be pressed from the top by one of said heat plates while the entire bottom surface of the same at least two wood sheets is supported from therebelow by the other heat plate for a predetermined length of time;

(f) laying at least one wood sheet on the previously laminated wood sheets in such an offset relation to said previously laminated wood sheets that said at least one wood sheet is positioned with one end surface located in facing relation to the first surface of the initial base material adjacent to the first surface to which one ends of said previously laminated wood sheets are located in facing relation;

(g) activating said hot press for pressing said at least one wood sheet for lamination thereof to the previously laminated wood sheets with a layer of thermosetting adhesive interposed between one surface of said at least one wood sheet and its mating surface of the previously laminated wood sheets and with the initial base material then positioned and maintained with respect to said plates where the entire top surface of said at least one wood sheet is kept to be pressed from the top by one of said heat plates while the entire bottom surface of the same at least one wood sheet is supported from therebelow by the other heat plate for a predetermined length of time;

(h) repeating the step (f) and (g) until the total thickness of the laminated wood sheets reaches the thickness of said initial base material, whereby a glued laminated wood board in progress is formed which has an end portion which is similar to said end of the initial base material, said end portion of the glued laminated wood board in progress being regarded as a base material for the subsequent lamination; and (i) repeating the steps (d) through (h) as many time as required until the desired length of the glued laminated wood board is made.

13. A method of manufacturing glued laminated wood according to claim 11 or 12, wherein said angle at which said first surface is formed with respect to the opposite top and bottom surfaces of said initial base material is right angle, whereby each of said first surfaces at the end of the initial base material are formed perpendicularly to said second surfaces.

14. A method of manufacturing glued laminated wood according to claim 13, wherein each wood sheet in each layer of the glued laminated wood board is disposed with an end thereof in abutment with an end of the adjacent wood sheet in the same layer.

15. A method of manufacturing glued laminated wood according to claim 13, wherein wood sheets in each layer of the glued laminated wood board are disposed with a space of a predetermined amount formed between any two facing end faces of any two adjacent wood sheets in said each layer.

16. A method of manufacturing glued laminated wood according to claim 11 or 12, wherein each wood sheet has its opposite ends beveled at a predetermined angle in the same direction with respect to the opposite surfaces of the wood sheet and the wood sheets in each layer are disposed with the beveled ends thereof in overlapping relation to their adjacent similarly beveled ends of wood sheets in said each layer.

17. A method of manufacturing glued laminated wood according to claim 11 or 12, wherein said initial base material is made of a plurality of wood sheets which are assembled one on another in multiple layers and laminated together into the form of an assembly having one end thereof formed in said flight of steps.

18. A method of manufacturing glued laminated wood according to claim 11 or 12, wherein the wood sheets are laminated together with the wood grain thereof running primarily along the length of the glued laminated wood board.

19. A method of manufacturing glued laminated wood according to claim 11 or 12, wherein the wood sheets for lamination includes sheets of veneer.

20. A method of manufacturing glued laminated wood according to claim 11 or 12, wherein at least one of the wood sheet is made of at least two sheets of wood whose total thickness substantially corresponds to said thickness of the wood sheet.

* * * * *